United States Patent
Ueda

(10) Patent No.: US 9,378,411 B2
(45) Date of Patent: Jun. 28, 2016

(54) METHOD FOR EXTRACTING IMPACT TIME IN GOLF SWING

(71) Applicants: DUNLOP SPORTS CO. LTD., Kobe, Hyogo (JP); SUMITOMO RUBBER INDUSTRIES, LTD., Kobe, Hyogo (JP)

(72) Inventor: Masahiko Ueda, Kobe (JP)

(73) Assignees: DUNLOP SPORTS CO. LTD., Kobe (JP); SUMITOMO RUBBER INDUSTRIES, LTD., Kobe (JP)

( * ) Notice: Subject to any disclaimer, the term of this patent is extended or adjusted under 35 U.S.C. 154(b) by 287 days.

(21) Appl. No.: 14/169,817

(22) Filed: Jan. 31, 2014

(65) Prior Publication Data

US 2014/0216180 A1 Aug. 7, 2014

(30) Foreign Application Priority Data

Feb. 1, 2013 (JP) ................................. 2013-018214

(51) Int. Cl.
*G01K 9/00* (2006.01)
*G06K 9/00* (2006.01)

(52) U.S. Cl.
CPC .......... *G06K 9/00342* (2013.01); *G06K 9/0053* (2013.01); *A63B 2220/833* (2013.01)

(58) Field of Classification Search
CPC ..................... G06K 9/00342; A63B 2220/833; A63B 2220/34
See application file for complete search history.

(56) References Cited

U.S. PATENT DOCUMENTS

| 2010/0267462 | A1 | 10/2010 | Mooney | |
| 2012/0316004 | A1* | 12/2012 | Shibuya | G06K 9/00342 473/212 |
| 2013/0304417 | A1* | 11/2013 | Mooney | A63B 69/3614 702/153 |

FOREIGN PATENT DOCUMENTS

| JP | 2011-196727 A | 10/2011 |
| JP | 2012-81773 A | 4/2012 |
| WO | WO 2012/069375 A1 | 5/2012 |

* cited by examiner

*Primary Examiner* — Paul West
(74) *Attorney, Agent, or Firm* — Birch, Stewart, Kolasch & Birch, LLP

(57) ABSTRACT

A method for extracting impact time in a golf swing includes acquiring at least one chronological waveform among chronological waveforms of an angular velocity about x-axis, an angular velocity about y-axis, and an angular velocity about z-axis obtained when a golf ball is hit by a golf club attached with a sensor that measures angular velocities about three axes, when the x-axis is orientated along a toe-heel direction of a golf club head, when the y-axis is orientated so as to follow along a direction in which a ball is hit, and when the z-axis is orientated to match an axial direction of a shaft; acquiring timing at which laser light, disposed immediately in front of where the golf club head impacts the ball, is shielded by the golf club head or the shaft; and determining an impact time using the at least one chronological waveform and the timing.

10 Claims, 26 Drawing Sheets

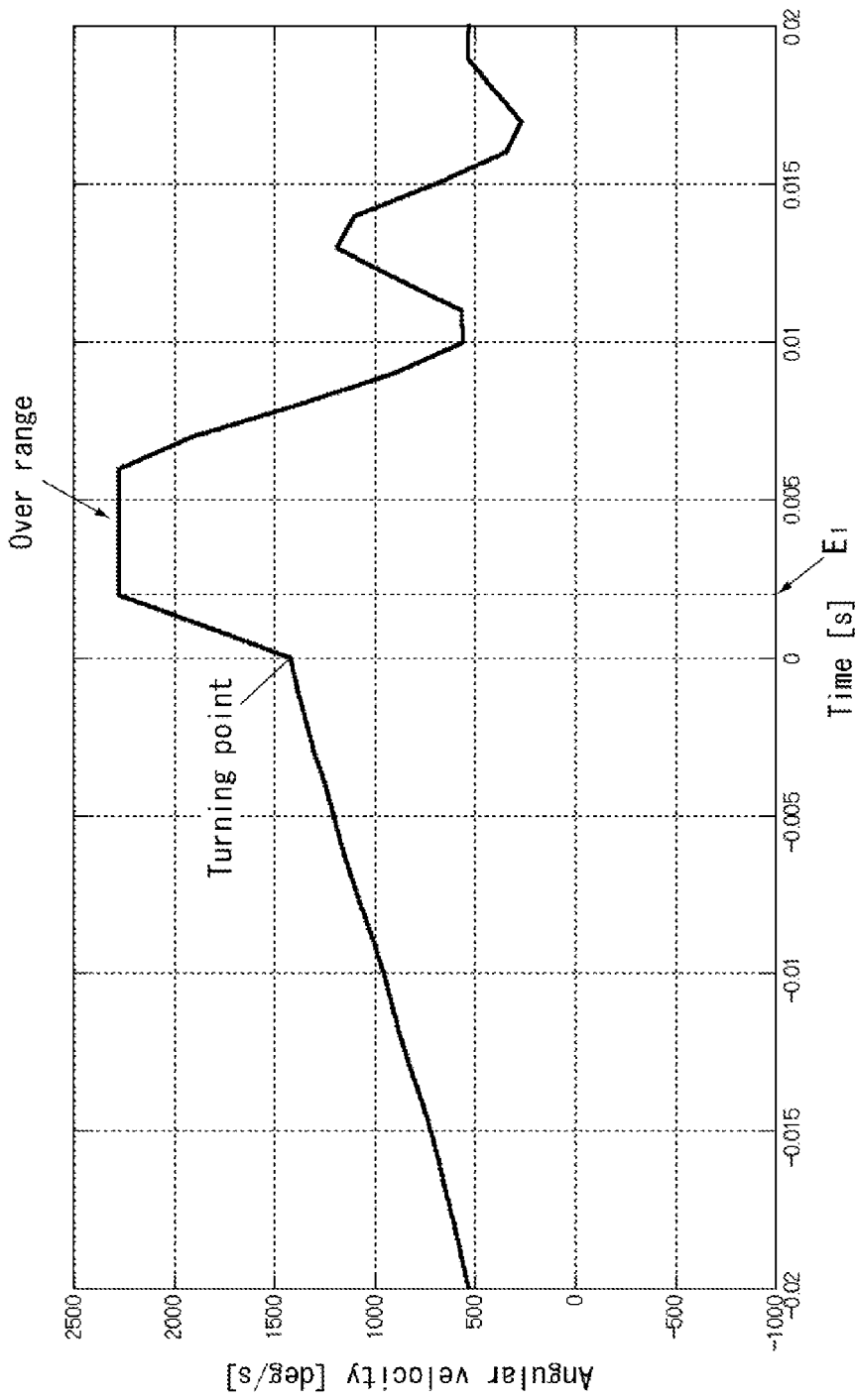

FIG. 15
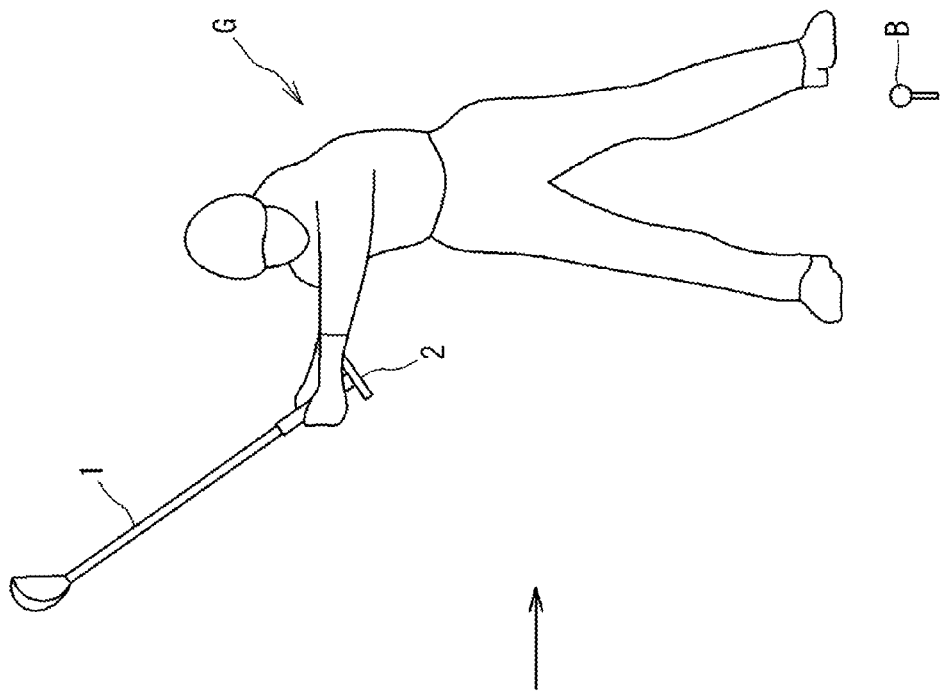
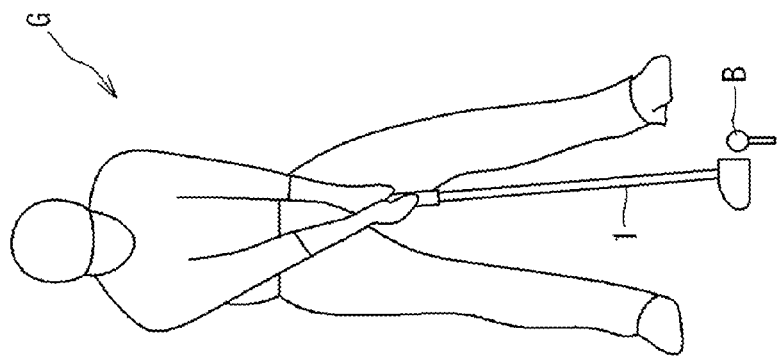

FIG. 16
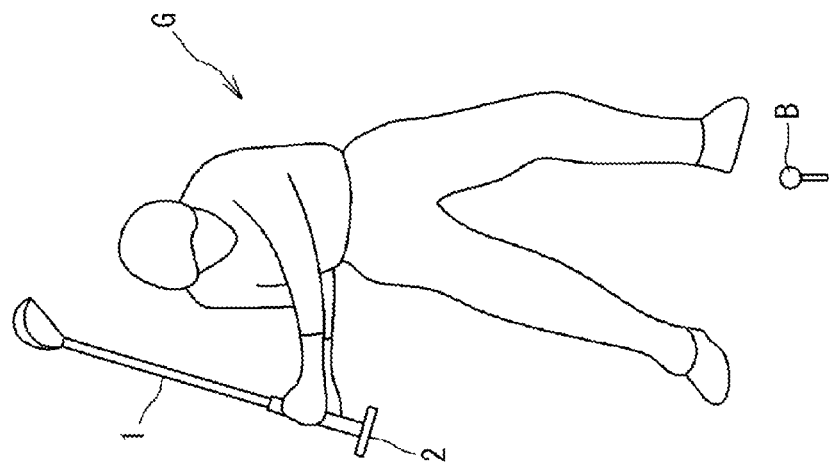
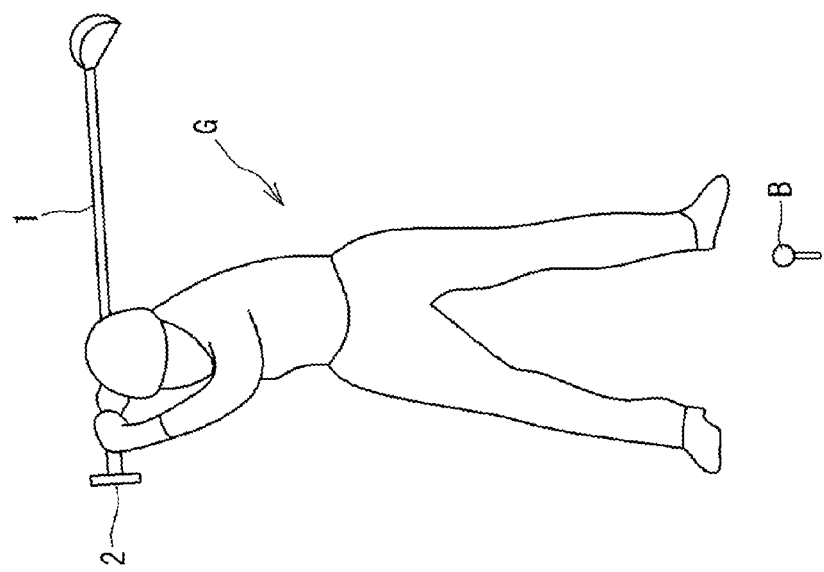

FIG. 17
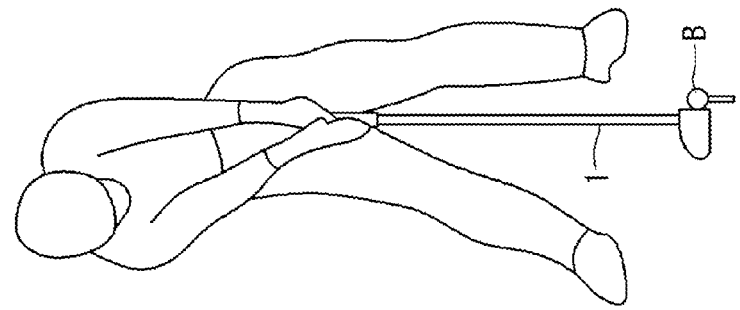
(S6)
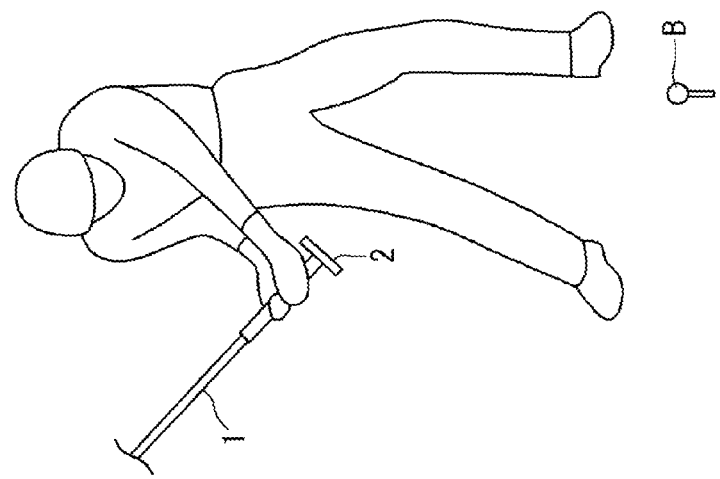
(S5)

METHOD FOR EXTRACTING IMPACT TIME IN GOLF SWING

TECHNICAL FIELD

The present invention relates to a method for extracting impact time in a golf swing.

BACKGROUND ART

For golfers, it is an eternal theme to extend flight distance of a ball and shoot the ball at an aimed direction and angle. Therefore, it is important to use a golf club suited for one's own swing. Selecting a golf club suited for a golfer is generally referred to as fitting.

With regard to this fitting, the present applicants have proposed a method of having a golfer actually hit a ball with a golf club whose grip is attached with a sensor capable of measuring angular velocity and acceleration about three axes, and analyzing a swing of the golfer from the obtained measurement result (Japanese Patent Application No. 2011-196727; hereinafter, also referred to as a "first prior invention"). With this method, a golf club that matches a golfer can be selected by properly analyzing a swing.

In the first prior invention, in order to classify a golfer's swing, impact time is extracted from a chronological waveform of angular velocity about a shaft axis measured using a sensor. Specifically, in a chronological waveform of an angular velocity of a golf swing including the moment of impact, a time at which the angular velocity about the shaft axis (z-axis) becomes a maximum is determined as a provisional impact time. Then, for the purpose of extracting the impact time with better accuracy, in around the provisional impact time (a time duration from a clock time before the provisional impact time by a predetermined time to a clock time after the provisional impact time by a predetermined time), a time that is the earlier between a time at which the angular velocity $\omega x$ about the x-axis becomes a minimum and a time at which an acceleration about the z-axis becomes a minimum is set as an impact time.

When a golfer hoping for a fitting test-hits a ball, depending on the place (hit-spot) where a club face hits a ball, there are cases as shown in FIG. 23 where the angular velocity $\omega z$ about the shaft axis becomes a maximum not at the time of impact but after impact. FIG. 23 and a later described FIG. 24 each show one portion (around the impact) of a chronological waveform of the angular velocity $\omega z$ about the shaft axis, and in these figures, the horizontal axis represents data point numbers from the start of data acquisition and the vertical axis represents angular velocity (deg/s). Since data sampling frequency in the illustrated examples is 1000 Hz, a single data point is 1 msec. In the example in FIG. 23, although point A is the proper impact time that should be extracted, there is a possibility that a point B, at which the angular velocity $\omega z$ is a maximum, is falsely recognized as the impact time.

In addition, in cases such as when a swing is performed at an angular velocity exceeding a measurable range of a gyro sensor used for the measurement, there are cases where over range of the sensor occurs as shown in FIG. 24. Also in this case, although point C is the proper impact time that should be extracted, there is a possibility that a point D, at which the angular velocity $\omega z$ is a maximum in the range, is falsely recognized as the impact time.

If a correct impact time is not determined, it is conceivable that the accuracy of fitting based on a swing of a golfer analyzed using the impact time will be influenced.

In response, the present applicants have proposed a method for extracting impact time in a golf swing, enabling improvement of accuracy in determining impact time (Japanese Patent Application No. 2012-081773; hereinafter, also referred to as a "second prior invention"). In the second prior invention, it is judged whether an angular velocity $\omega z$ about a shaft axis is over range, and a method for determining the impact time is changed depending on the judgment result.

In the second prior invention, a predetermined provisional impact time is configured in accordance with whether or not over range has occurred, three candidates of impact time are acquired from respective chronological waveforms of angular velocities about three axes by using the provisional impact time as a reference, and impact time is determined from these three candidates in accordance with a predetermined determination criterion. As a result, impact time can be determined with fine accuracy by removing the effect of the above described over range etc.

SUMMARY OF INVENTION

Technical Problem

However, with the method for extracting impact time only from a chronological waveform of an angular velocity measured using a sensor, there are cases, albeit rare, where correct impact time cannot be determined.

For example, at the time of impact, if a ball is test-hit with the front end (toe side) of a club head, the angular velocity $\omega z$ about a shaft axis becomes a maximum immediately before impact, and this moment may be falsely recognized as the provisional impact time. Furthermore, as shown in FIG. 25, if a golfer performs a sudden waggle movement at the time of address, the angular velocity $\omega z$ may become a maximum in measured data at a time other than the impact, and the provisional impact time may be falsely recognized also in this case. In addition, when over range does not occur due to a measuring range of an angular velocity of a sensor becoming wider than that of a conventional product, the impact time cannot be correctly determined if two or more peaks are generated during a time interval in which waveform has been conventionally flat as shown in FIG. 26. Thus, there is a possibility that t2 (FIG. 25) or t3 (FIG. 26), which are different from a provisional impact time t1 that should have been extracted, is falsely recognized as the provisional impact time.

Furthermore, in the second prior invention, since a clock time at which the extracted angular velocity $\omega z$ about the shaft axis is a maximum is used as a starting point, and the impact time is extracted from a range of a predetermined time; if golf clubs and golf balls having characteristics that are greatly different from the current ones are sold in the future, it is also conceivable that vibration characteristics of the shaft greatly change, and an inflection point or a minimum value may not appear within the predetermined time.

The present invention has been made in view of such circumstances, and an objective of the present invention is to provide a method that is for extracting impact time in a golf swing and that can improve accuracy in determining impact time.

Solution to Problem (1) In accordance with the present invention, there is provided a method for extracting impact time in a golf swing (hereinafter, also simply referred to as an "extraction method") including the steps of:

acquiring at least one chronological waveform among chronological waveforms of an angular velocity ωx about x-axis, an angular velocity ωy about y-axis, and an angular velocity ωz about z-axis obtained when a golf ball is hit by a golf club attached with a sensor capable of measuring angular velocities about three axes, when the x-axis is orientated in a direction along a toe-heel direction of a golf club head, when the y-axis is orientated so as to follow along a direction in which a ball is hit, and when the z-axis is orientated to match an axial direction of a shaft;

acquiring timing at which laser light, disposed immediately in front of where the golf club head impacts the ball, is shielded by the golf club head or the shaft; and determining an impact time using the at least one chronological waveform and the timing.

In the extraction method of the present invention, an impact time is determined using at least one chronological waveform among chronological waveforms of an angular velocity ωx about x-axis, an angular velocity ωy about y-axis, and an angular velocity ωz about z-axis obtained from a sensor attached to a golf club, and timing at which laser light disposed immediately in front of where a golf club head impacts a ball is shielded. As a result, it is possible to improve accuracy in determining the impact time.

When a ball is hit at a typical head speed, energy is transmitted from a club to the ball within 5/10000 seconds from the contact between the ball and the club, and vibration is transferred from the ball to the club as a reaction. In the present specification, the moment at which such vibration is transferred to the club is referred to as an "impact time."

(2) Possibly in the extraction method of (1), the step of determining includes the sub-steps of:

calculating, when timing at which a signal indicating laser blockage transmitted from a light receiver configured to receive the laser light is received by the sensor is defined as trigger timing, an amount of change of the angular velocity about the x-axis in a predetermined time interval before the trigger timing; and determining whether or not the calculated amount of change of the angular velocity is larger than a predetermined threshold.

(3) Possibly in the extraction method of (2), at the step of determining, when the calculated amount of change of the angular velocity is determined to be smaller than a predetermined threshold, the step of determining further includes the sub-steps of:

judging whether or not the angular velocity ωz is over range in a predetermined time duration;

configuring a first provisional impact time when a judgment of over range is obtained in the step of judging, and configuring a second provisional impact time when a judgment of over range has not been obtained in the step of judging;

acquiring three candidates for impact time from respective chronological waveforms of the angular velocity ωx, the angular velocity ωy, and the angular velocity ωz using the configured first or second provisional impact time as reference; and determining impact time in accordance with a predetermined determination criterion from the three candidates for impact time.

(4) Possibly in the extraction method of (3), the first provisional impact time is set to a time at which over range has occurred in the chronological waveform of the angular velocity ωz.

(5) Possibly in the extraction method of (3) or (4), when a minimum value has occurred in the chronological waveform of the angular velocity ωz in a first predetermined time before a time at which a maximum value has occurred, the second provisional impact time is set as a time at which a maximum value has occurred in a second predetermined time before the time at which the minimum value has occurred.

Furthermore, possibly in the extraction method of (3), when a minimum value has not occurred in the chronological waveform of the angular velocity ωz in a first predetermined time before a time at which a maximum value has occurred, the maximum value is set as the second provisional impact time.

Furthermore, the first predetermined time may be set to 10 to 30 msec and the second predetermined time may be set to 20 to 40 msec.

Possibly, the candidate of impact time acquired from the chronological waveform of the angular velocity ωx is set to a time at which a minimum value has occurred in a third predetermined time before a time at which a local maximum value has firstly occurred in a first predetermined time duration around the first provisional impact time;

the candidate of impact time acquired from the chronological waveform of the angular velocity ωy is set to a time at which a turning point has firstly occurred in a second predetermined time duration around the first provisional impact time; and the candidate of impact time acquired from the chronological waveform of the angular velocity ωz is set to a time at which a turning point has firstly occurred in a fourth predetermined time before the first provisional impact time.

The third predetermined time may be set to 20 to 40 msec and the fourth predetermined time may be set to 30 to 50 msec.

Possibly, the candidate of impact time acquired from the chronological waveform of the angular velocity ωx is set to a time at which a minimum value has occurred in a first predetermined time duration around the second provisional impact time, in a third predetermined time before a time at which a local maximum value has firstly occurred;

the candidate of impact time acquired from the chronological waveform of the angular velocity ωy is set to a time at which a turning point has firstly occurred in a second predetermined time duration around the second provisional impact time; and the candidate of impact time acquired from the chronological waveform of the angular velocity ωz is set to a time at which a turning point has firstly occurred in a third predetermined time duration around the second provisional impact time.

Furthermore, the first predetermined time duration may be a time duration starting 50 msec before the first or second provisional impact time and ending 20 msec after the first or second provisional impact time; and the second predetermined time duration may be a time duration starting 30 msec before the first or second provisional impact time and ending 50 msec after the first or second provisional impact time.

Furthermore, the third predetermined time duration may be a time duration starting 40 msec before the second provisional impact time and ending 15 msec after the second provisional impact time.

(6) Possibly in the extraction method of (1) to (5), the laser light is disposed, when a flight direction of the ball is used as reference, 1 mm to 10 mm behind a back end of a ball.

Advantageous Effects of Invention

With the extraction method of the present invention, it is possible to improve accuracy in determining impact time.

BRIEF DESCRIPTION OF DRAWINGS

FIG. 7 shows an example of a chronological waveform of an angular velocity about z-axis in which over range has occurred.

FIG. 15 shows the address and backswing in a swing.

FIG. 16 shows the top and downswing in a swing.

FIG. 17 shows the downswing and impact in a swing.

DESCRIPTION OF EMBODIMENTS

In the following, embodiments of an extraction method of the present invention will be described in detail with reference to the accompanying drawings.

The extraction method of the present invention is a method for extracting, with fine accuracy, impact time used when analyzing characteristics of a swing of a golfer in order to perform fitting. Characteristics of a swing distinctive of a golfer can be quantitatively understood as described later, and such characteristics are referred herein as "swing characteristic amounts."

[Acquiring Angular Velocity]

Figure 1:
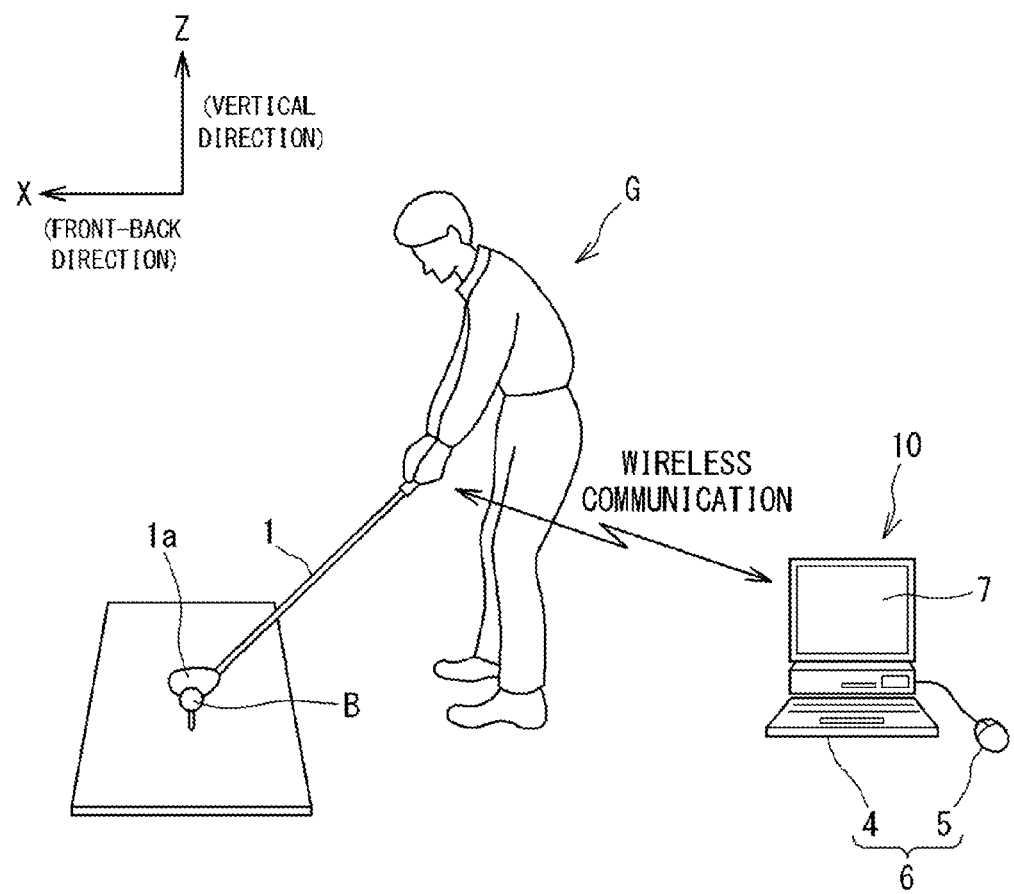
FIG. 1 is a view for describing a method for measuring a swing characteristic amount in the present invention.
Figure 2:
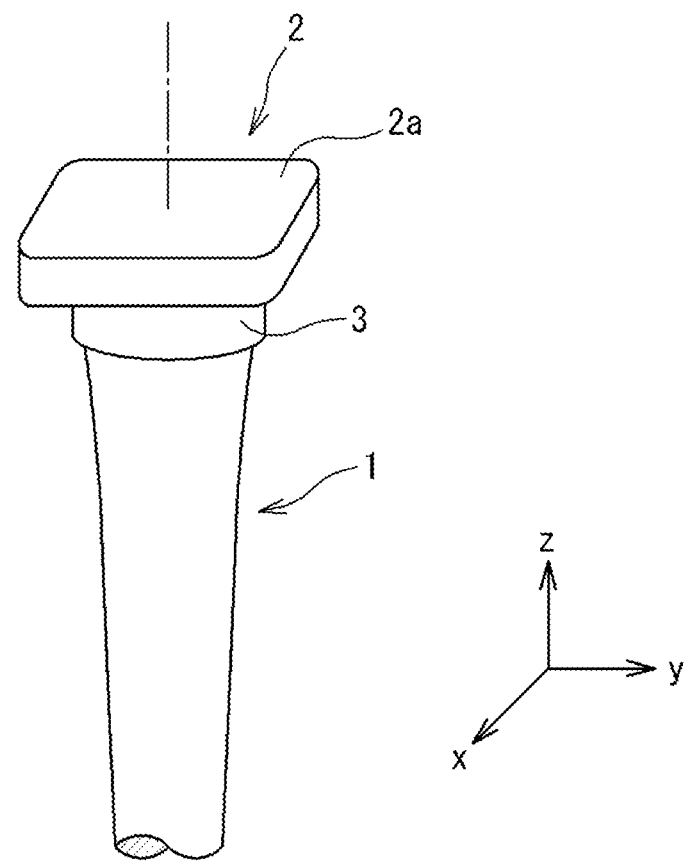
FIG. 2 is a partial expansion perspective view of a golf club having attached thereto a sensor.
Figure 3A:
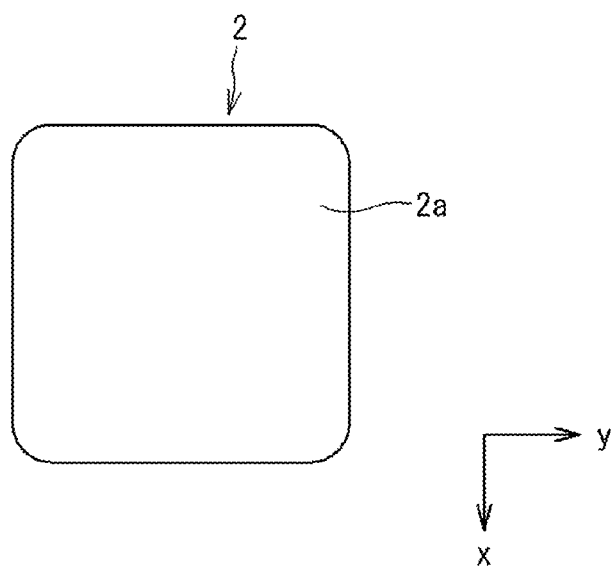
FIG. 3A is a plan view of the sensor shown in FIG. 2.
Figure 3B:
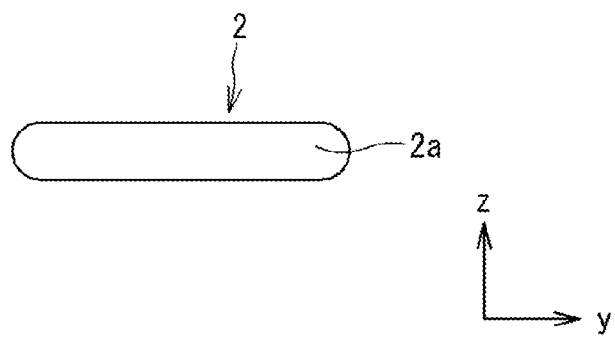
FIG. 3B is a side view of the sensor.

As shown in FIG. 1, a golfer hoping for fitting of a golf club is asked to actually swing a golf club, and swing characteristic amounts can be measured from the swing. At a grip end of a golf club 1, a sensor 2 capable of measuring angular velocities about three axes is attached via an adapter 3 as shown in FIGS. 2 and 3. In the present embodiment, the sensor 2 includes a casing 2a formed from a box that is a square shape in planar view, and the casing 2a may be fixed to the grip end using a double-sided tape, an adhesive, a screw, or the like. In the example shown in FIG. 1, a golfer G is a right-handed person and is in an address state immediately before initiating a swing to hit a ball B set at a predetermined position.

The sensor 2 is wireless, and measured data are transmitted through wireless communication to a wireless receiver (not shown) built in a computer 10 that functions as a data analysis device. For the wireless communication, for example, standards and technologies of Bluetooth (Registered trademark) can be used.

The sensor 2 has built therein an angular velocity sensor (not shown) capable of measuring angular velocities about three axial directions (x-axial direction, y-axial direction, and z-axial direction). The sensor 2 further includes an A/D converter, a CPU, a wireless interface, a wireless antenna, and a power supply. As the power supply, for example, a button type lithium ion battery or the like can be used. The battery may be one that is rechargeable. Furthermore, the sensor 2 may also include a charging circuit for recharging a battery. Examples of the sensor 2 that can be used include WAA-010 (product name) manufactured by Wireless Technologies, Inc.

It should be noted that the wireless receiver for receiving signals from the sensor 2 includes a wireless antenna, a wireless interface, a CPU, and a network interface.

The computer 10 that functions as a data analysis device includes an input section 6 consisting of a keyboard 4 and a mouse 5, and a display section 7. In addition, although not shown, the computer 10 includes a hard disk, a memory, a CPU, and a network interface.

The sensor 2 detects angular velocities about respective axes of x-axis, y-axis, and z-axis. These angular velocities are obtained as analog signals, and these analog signals are converted into digital signals by the A/D converter built in the sensor 2. Output from the A/D converter is transmitted to the CPU and computational processes such as primary filtering are executed. Data processed in the sensor 2 in this manner is transmitted to the wireless receiver built in the computer 10 from the wireless antenna through the wireless interface.

Data transmitted from the sensor 2 is received by the wireless interface through the wireless antenna on the wireless receiver side. The received data is processed by the CPU of the computer 10.

Data sent to the computer 10 are stored in a memory resource such as the hard disk. The hard disk has stored therein a program, data, and the like required for data processing etc. The program causes the CPU to execute required data processing. The CPU is capable of executing various computational processes, and a computed result is outputted to the display section 7, or a printer that is not shown, etc.

When attaching the sensor 2 to the grip end, the relationships between measurement axes and the golf club 1 are taken into consideration. In the present embodiment, the z-axis of the sensor 2 matches the shaft axis of the golf club 1. The x-axis of the sensor 2 is orientated so as to follow along a toe-heel direction of a head 1a of the golf club 1. In addition, the y-axis of the sensor 2 is orientated so as to follow along a normal line direction of a face surface of the head 1a. By attaching the sensor 2 in this manner, computation can be simplified.

In the present embodiment, there is considered a local coordinate system to a global coordinate system (three-dimensional orthogonal coordinate system) in which the Z-axis is oriented so as to follow along a vertical direction, the X-axis is oriented so as to follow along the front-back direction of a golfer, and the Y-axis is oriented so as to follow along a target direction (which is a direction connecting a hitting point and a target point and being parallel to the grand). The x-axis, y-axis and z-axis of the local coordinate system form a three-dimensional orthogonal coordinate system. In the present embodiment, the z-axis is defined as the shaft axis of the golf club 1, and the x-axis is oriented so as to follow along the toe-heel direction of the head 1a. In addition, the y-axis is orientated so as to follow along a direction in which a ball is hit.

Thus, the z-axis in the local coordinate system matches the z-axis of the sensor 2, and the y-axis of the local coordinate system matches the y-axis of the sensor 2. In addition, the x-axis of the local coordinate system matches the x-axis of the sensor 2.

With the sensor 2, a plurality of chronologically successive data points can be obtained. The number of data points per unit of time depends on sampling frequency. The sampling frequency may be, for example, 1000 Hz.

[Acquiring Laser Light Shielding Timing]

Figure 4:
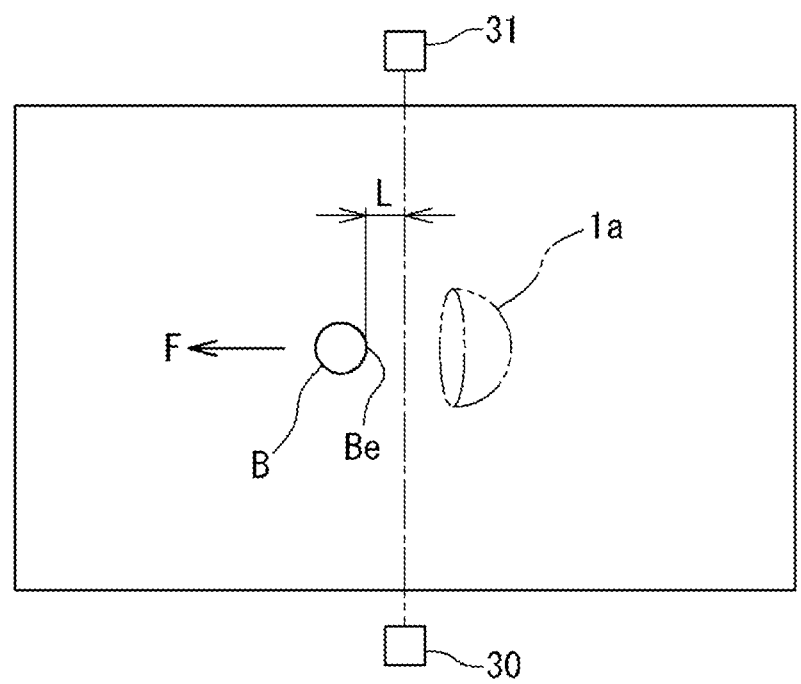
FIG. 4 is a view for describing arrangement of a laser oscillator and a laser receiver.

In the present embodiment, impact time is determined using chronological waveforms of angular velocities about three axes acquirable from the sensor 2, and timing at which laser light, disposed immediately in front of where the golf club head 1a impacts the ball B, is shielded. Therefore, in the present embodiment, common laser oscillator 30 and laser receiver 31 are arranged such that laser light is disposed at a location separated from a back end Be of the ball B by a distance L toward the back when a flight direction (cf. arrow F in FIG. 4) of the ball B is used as reference as shown in FIG. 4. The distance L can be selected by taking into consideration a head speed of the golfer etc., and may be set at, for example, about 1 to 10 mm. It should be noted that, the magnitude of the distance L is represented in FIG. 4 in an exaggerated manner for ease of understanding.

[Extraction of Impact Time]

Figure 5:
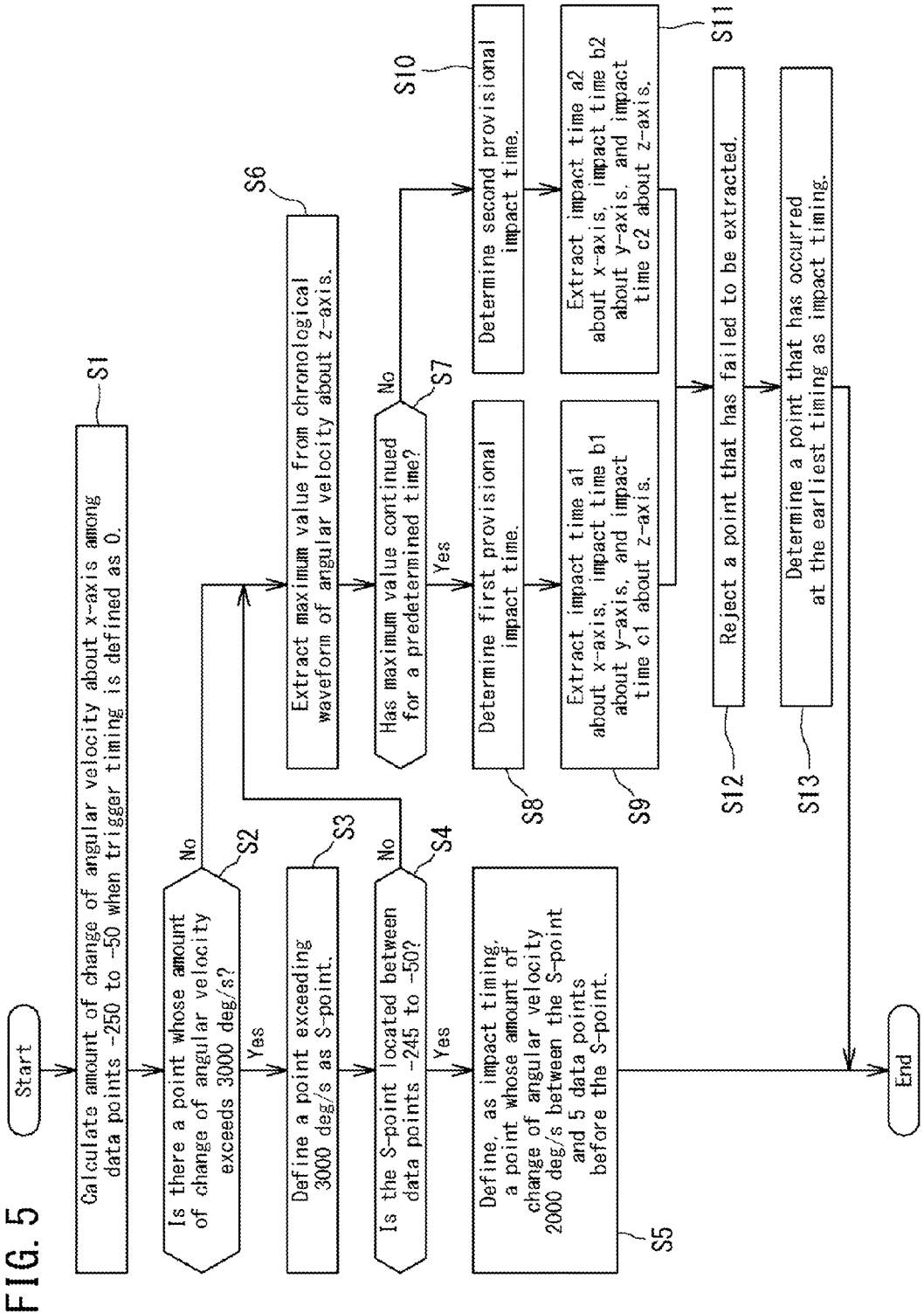
FIG. 5 is a flowchart of one embodiment of the extraction method of the present invention.

FIG. 5 is a flowchart of the method for extracting impact time according to one embodiment of the present invention.

First, at step S1, an amount of change of angular velocity is calculated from angular velocity about the x-axis among data points −250 to −50 when trigger timing is defined as 0. As described herein, "trigger timing" refers not to timing at which the laser light is blocked or shielded by the club head, but to timing at which a signal indicating laser blockage is transmitted from the laser receiver 31 and is received by the sensor 2 via the computer 10. In the present embodiment, the number of data points or the like is configured under the premise that impact timing at which the club head hits the ball exists between the actual laser blockage and the "trigger timing." The sampling period of a data point is 1/1000 seconds in the present embodiment. Thus, when trigger timing is defined as 0, a range between data points −250 to −50 refers a duration starting 250/1000 seconds before the trigger timing and ending 50/1000 seconds before the trigger timing, and is one example of a "predetermined time interval before the trigger timing" in the claims. It should be noted that an "amount of change of angular velocity" indicates a difference of angular velocity for each single data point.

Figure 6A:
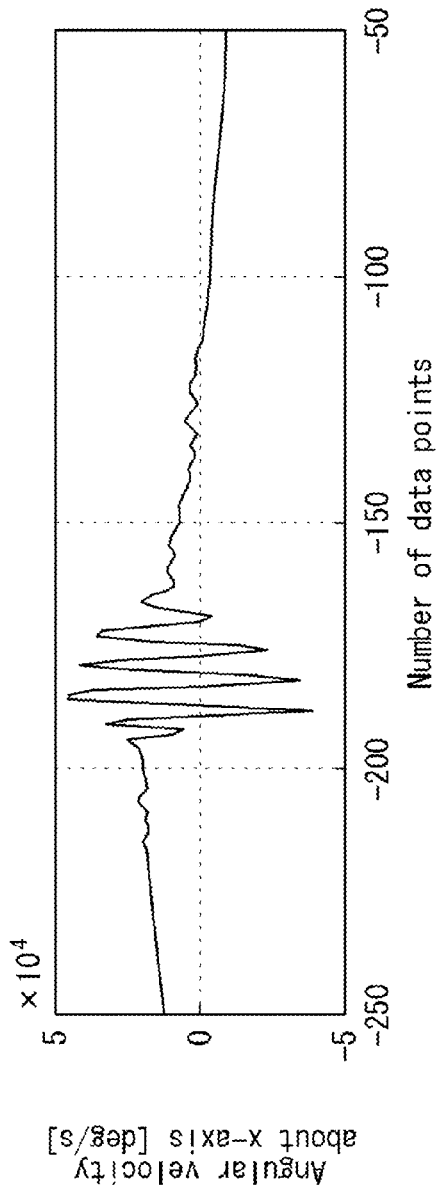
FIG. 6A shows an example of angular velocity.
Figure 6B:
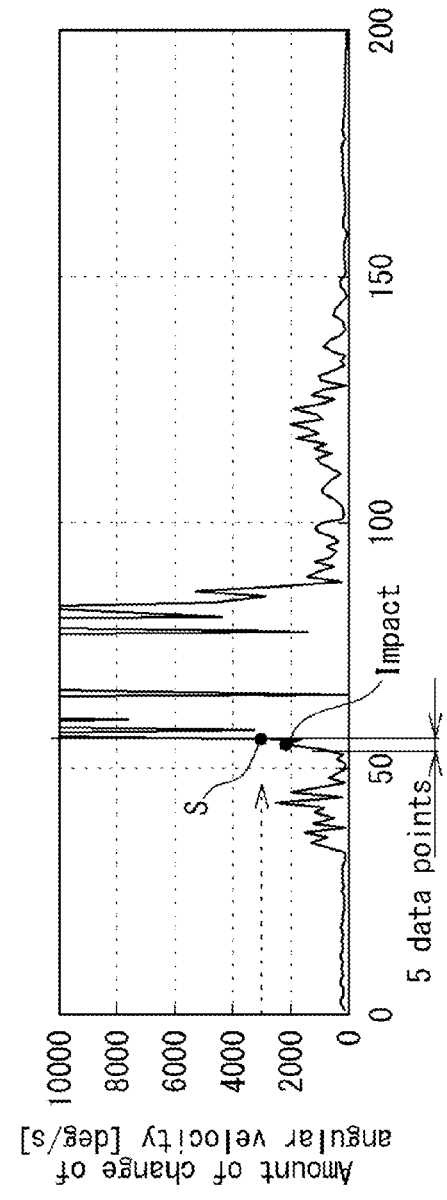
FIG. 6B shows an example of an amount of change of the angular velocity.

FIG. 6A shows an angular velocity when a certain tester test-hits at a head speed of 50 to 55 m/s, and FIG. 6B shows an amount of change of the angular velocity shown in FIG. 6A. The angular velocity in FIG. 6A is the above described angular velocity about the x-axis between data points −250 to −50 when trigger timing is defined as 0.

Next, at step S2, it is determined whether or not there is a point whose amount of change of angular velocity calculated at step S1 exceeds 3000 deg/s. In the present embodiment, a point whose amount of change of angular velocity exceeds 3000 deg/s is determined as a turning point. If it is determined that a point exceeding 3000 deg/s exists (YES), the flow advances to step S3. At step S3, a point that firstly exceeds 3000 deg/s in the data range (data points −250 to −50) is defined as S-point (turning point).

Next, at step S4, it is determined whether or not the S-point set at step S3 is located between data points −245 to −50. Then, if the S-point is determined to be located between data points −245 to −50, the flow advances to step S5. At step S5, a point whose amount of change of angular velocity exceeds 2000 deg/s between the S-point and 5 data points before the S-point is defined as impact timing.

On the other hand, if it is determined at step S2 that a point whose amount of change of angular velocity exceeding 3000 deg/s does not exist (NO), and if it is determined at step S4 that the S-point is not located between data points −245 to −50 (NO), the flow advances to step S6. At step S6, a maximum value is extracted from the chronological waveform of the angular velocity ωz about the shaft axis (z-axis). Thus, in accordance with the second prior invention described above, it is judged whether the angular velocity ωz about the shaft axis is over range, and a method for determining impact time is changed depending on the judgment result. Even if it is determined at step S2 that a turning point exists, when the turning point is not located between data points −245 to −50, it is assumed that a turning point does not exist since there is a possibility of the impact existing in a range other than this.

Figure 23:
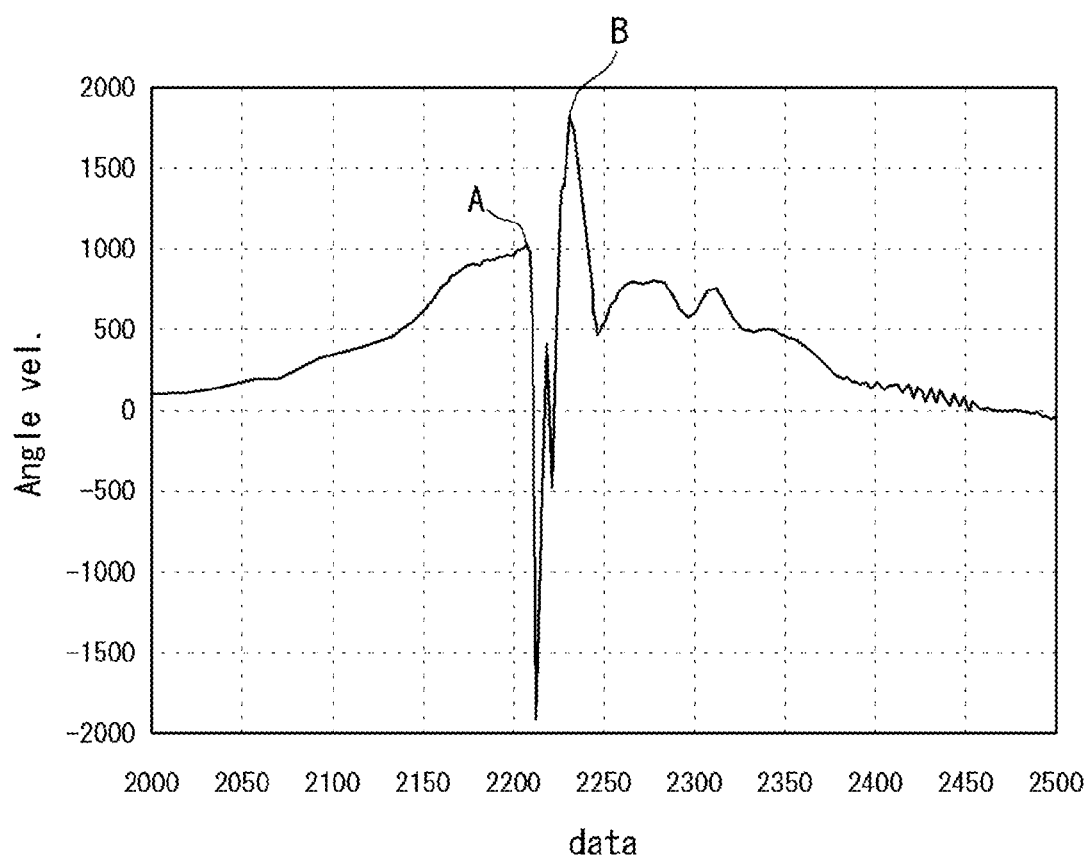
FIG. 23 shows one example of a chronological waveform of an angular velocity about a shaft axis.
Figure 24:
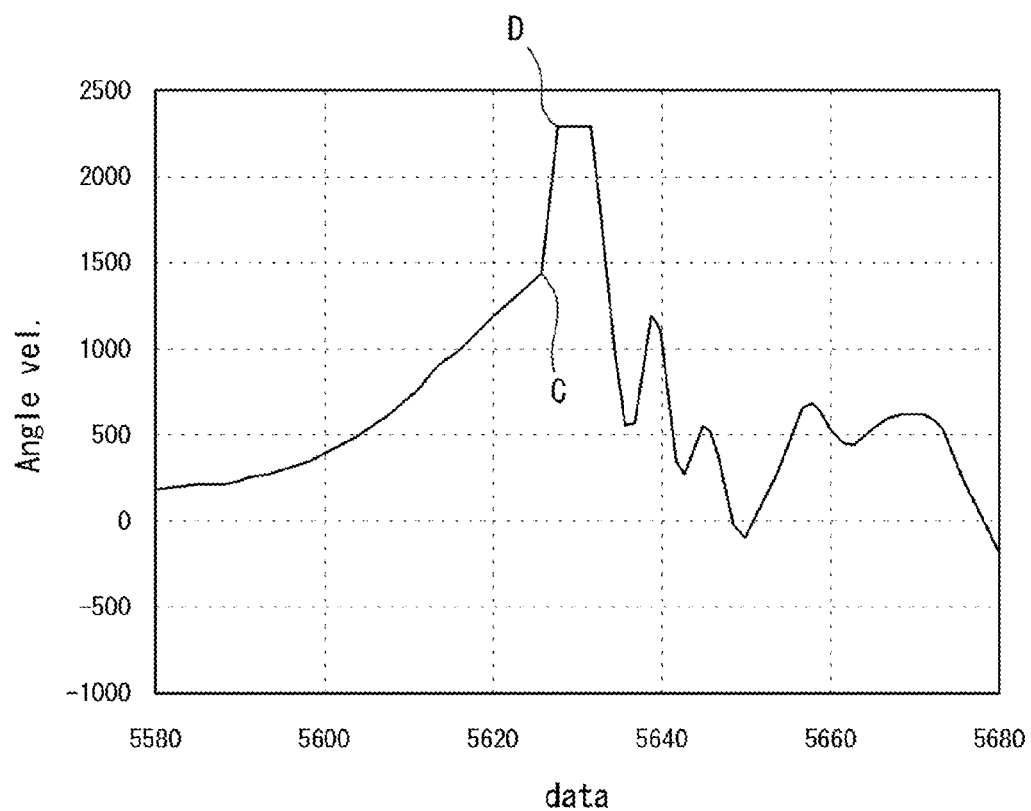
FIG. 24 shows another example of a chronological waveform of the angular velocity about the shaft axis.
Figure 25:
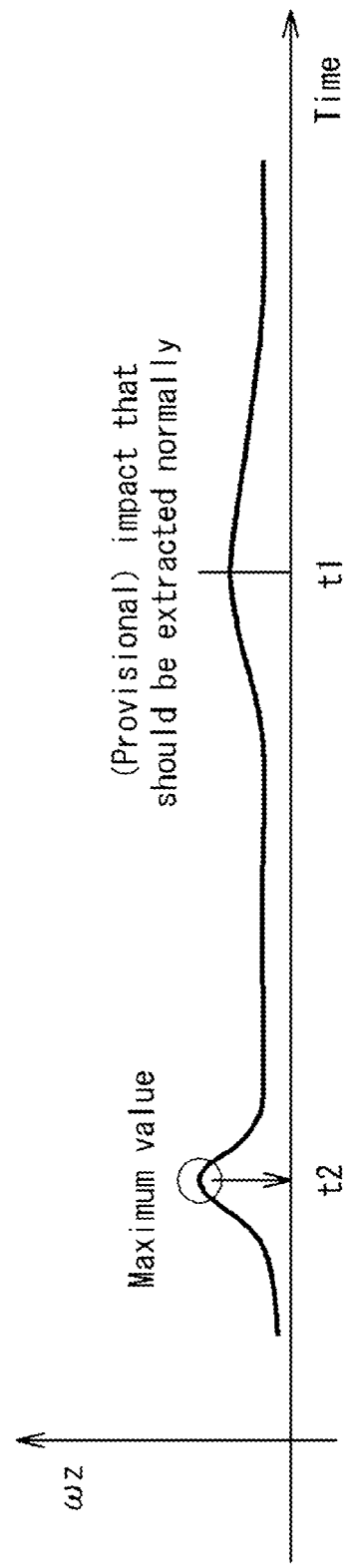
FIG. 25 shows one example of a chronological waveform in which ωz becomes maximum at a time other than the time of impact.
Figure 26:
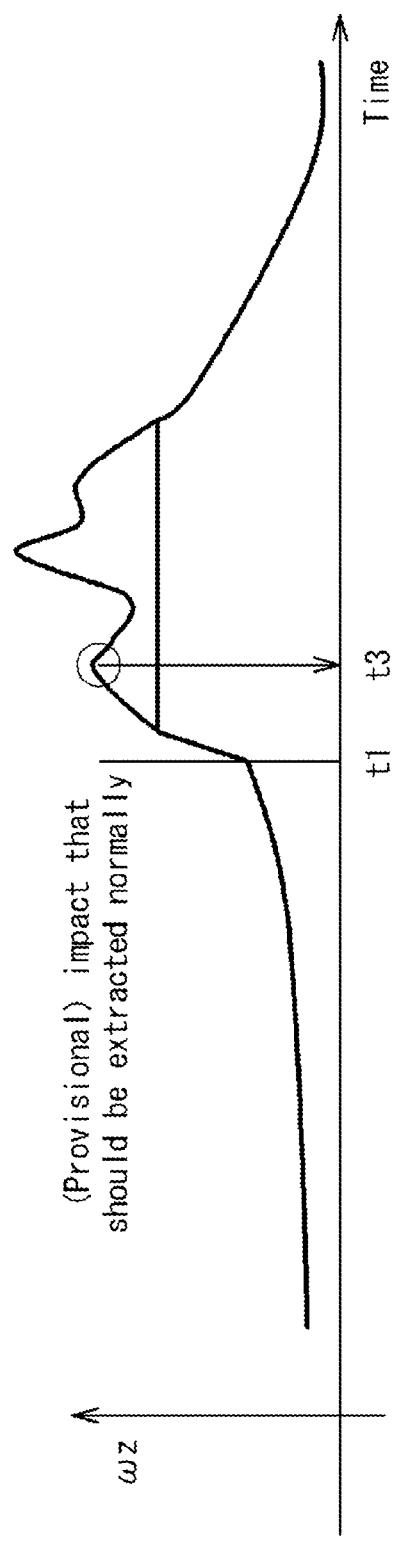
FIG. 26 shows one example of a chronological waveform in which occurrence of over range has disappeared due to expansion of measuring range.

Next, at step S7, it is determined whether or not the maximum value extracted at step S6 has continued for a predetermined time (e.g., 3 msec or longer). Having a maximum value continuing for a predetermined time may be considered as over range of the sensor occurring due to reasons such as rotational velocity of the wrist being fast etc., as shown in FIG. 7. It should be noted that, although the horizontal axis represents time in the example shown in FIG. 7, when the horizontal axis of the chronological waveform represents the data point number from the start of data acquisition as in the examples shown in FIGS. 23 and 24, it is also possible to determine whether or not over range has occurred by counting the number of continuous data points acquired through sampling at a predefined frequency.

At step S7, when it is determined that the extracted maximum value has continued for a predetermined time, the flow advances to step S8, and the first provisional impact time is determined at step S8. Since a maximum value will continue when over range has occurred, a timing (time) at which a maximum value firstly occurs is set as a first provisional impact time $E_1$.

Next, at step S9, by using the first provisional impact time $E_1$ determined at step S8, an impact time a1, which is one candidate of the impact time, is extracted from the chronological waveform about the x-axis. Extraction of the impact time a1 is conducted in the following manner.

Figure 8:
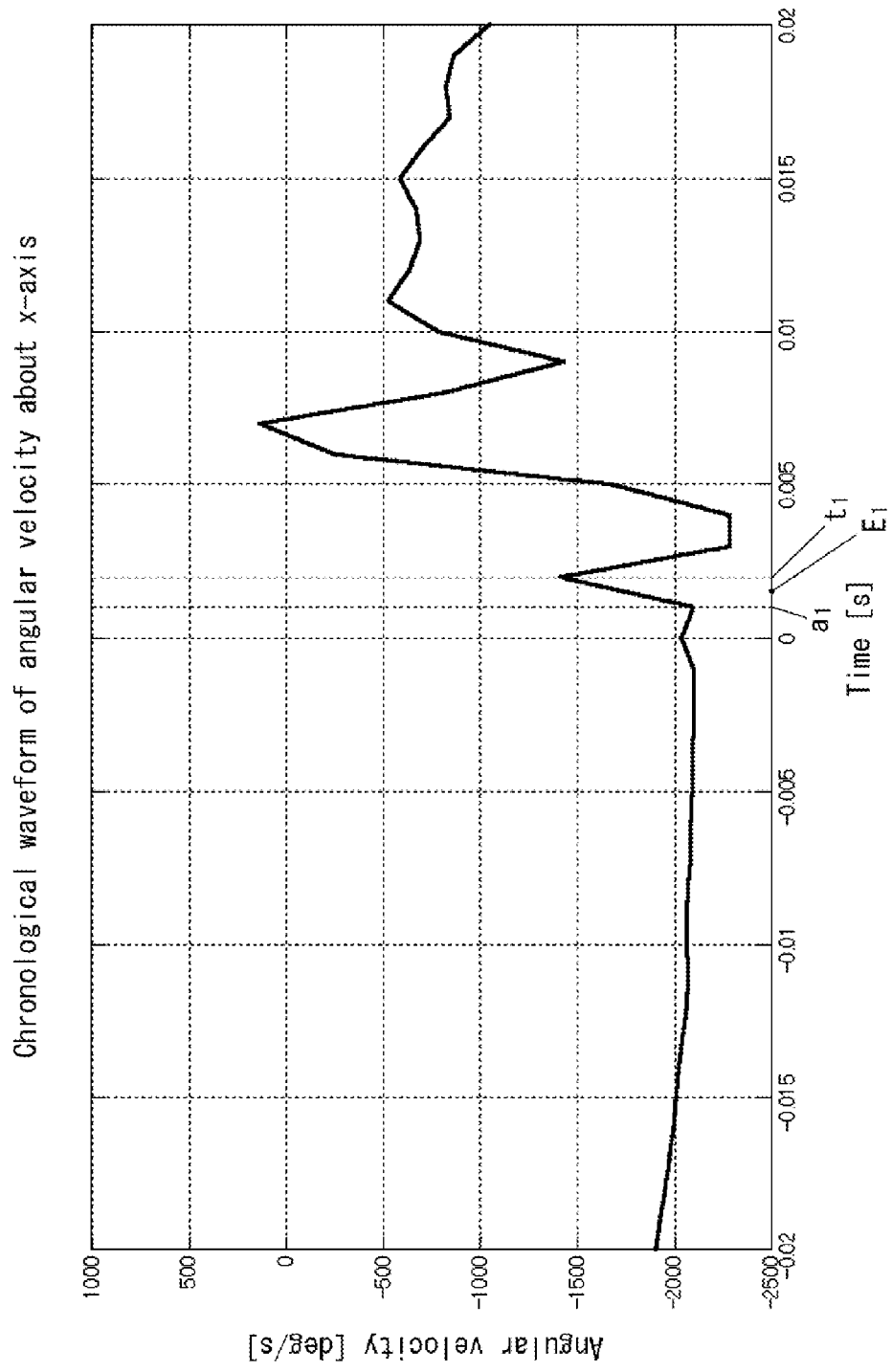
FIG. 8 shows an example of a chronological waveform of an angular velocity about x-axis.

FIG. 8 shows one portion (around impact) of one example of a chronological waveform of the angular velocity ωx about the x-axis. At step S8, when the first provisional impact time $E_1$ is determined, the impact time a1 is extracted using as a reference a time corresponding to the first provisional impact time $E_1$ in the chronological waveform of the angular velocity ωx about the x-axis. Specifically, first, a time is obtained at which a local maximum value firstly occurs in a predetermined time duration (first predetermined time duration) around the first provisional impact time $E_1$. It is possible to set, as the predetermined time duration (first predetermined time duration), for example, a time duration starting 50 msec before the first provisional impact time $E_1$ and ending 20 msec after the first provisional impact time $E_1$. In FIG. 8, t1 represents the time at which a local maximum value firstly occurs.

Next, a time at which a minimum value occurs in a predetermined time (third predetermined time) before the time t1 at which the local maximum value firstly has occurred is set as the impact time a1. It is possible to set the predetermined time (third predetermined time) as, for example, 3 msec.

Next, at the same step S9, by using the first provisional impact time $E_1$ determined at step S8, an impact time b1, which is one candidate of the impact time, is extracted from the chronological waveform about the y-axis. Extraction of the impact time b1 is conducted in the following manner.

Figure 9:
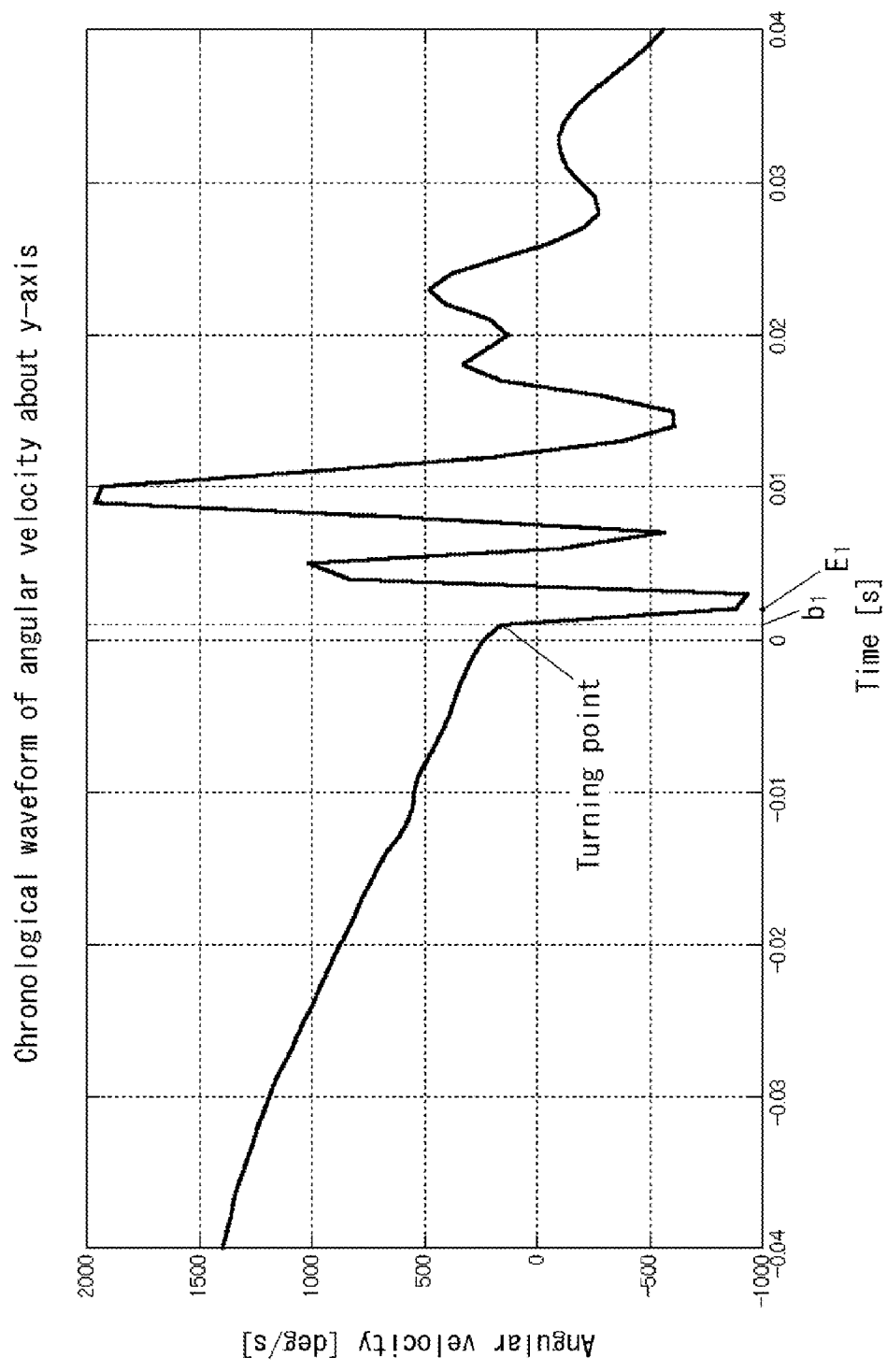
FIG. 9 shows an example of a chronological waveform of an angular velocity about y-axis.

FIG. 9 shows one portion (around impact) of one example of a chronological waveform of the angular velocity ωy about the y-axis. At step S8, when the first provisional impact time $E_1$ is determined, the impact time b1 is extracted using as a reference a time corresponding to the first provisional impact time $E_1$ in the chronological waveform of the angular velocity ωy about the y-axis. Specifically, a time at which a turning point firstly occurs in a predetermined time duration (second predetermined time duration) around the first provisional impact time $E_1$ is set as the impact time b1. It is possible to set, as the predetermined time duration (second predetermined time duration), for example, a time duration starting 30 msec before the first provisional impact time $E_1$ and ending 50 msec after the first provisional impact time $E_1$.

Figure 10:
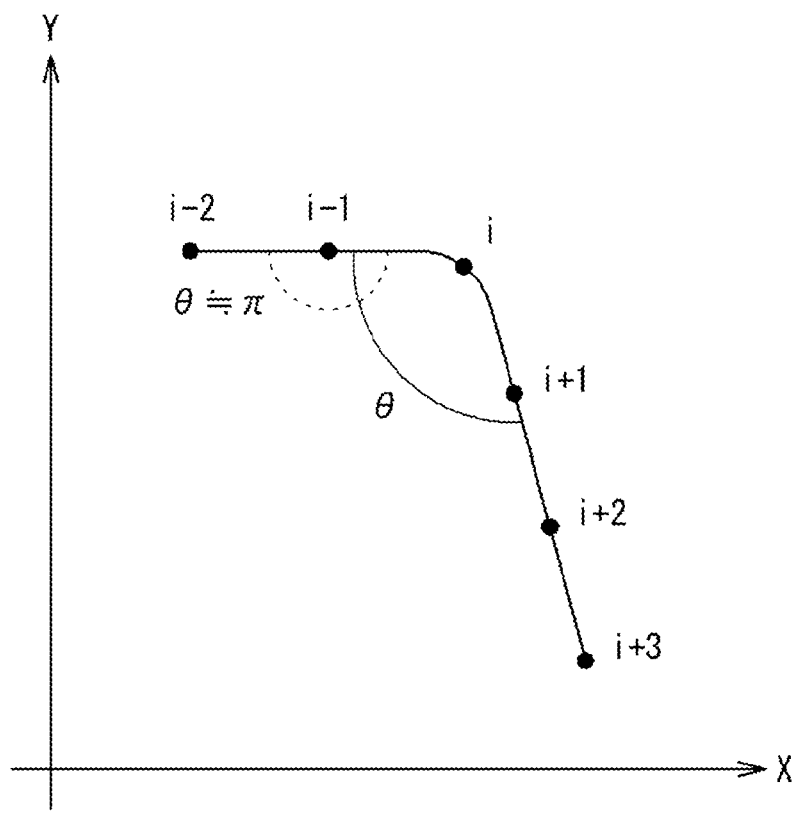
FIG. 10 shows how to obtain a turning point.

A turning point can be obtained, for example, in the following manner. FIG. 10 shows how to obtain a turning point. A middle point in three points that are continuous is used as a center, and an angle θ formed by this central point and the points before and after that is obtained. In FIG. 10, since three continuous points of (i-2), (i-1), and (i) are almost on a straight line, a line segment connecting points (i-2) and (i-1) and a line segment connecting points (i-1) and (i) form an angle θ≈π. Then, the angle θ is continuously calculated by shifting the point that is in the middle by one point each time. At a point other than a turning point, θ≈π is satisfied, whereas the angle θ becomes small at a turning point. A point at which θ becomes a minimum is defined as a "turning point." In the example in FIG. 10, point (i) is a turning point.

Next, at the same step S9, by using the first provisional impact time $E_1$ determined at step S8, an impact time c1, which is one candidate of the impact time, is extracted from the chronological waveform about the z-axis. Extraction of the impact time c1 is conducted in the following manner.

In FIG. 7, in the angular velocity ωz about the z-axis, which is a prerequisite for the extraction, over range has occurred. In such a case, although a time at which a maximum value has firstly occurred, i.e., a time at which over range has occurred, is set as the first provisional impact time $E_1$; a time at which a turning point firstly occurs in a predetermined time (fourth predetermined time) before the first provisional impact time $E_1$ is set as the impact time c1. It is possible to set the predetermined time (fourth predetermined time) as, for example, 40 msec. It should be noted that the turning point can be acquired using a method described in step S9.

Figure 11:
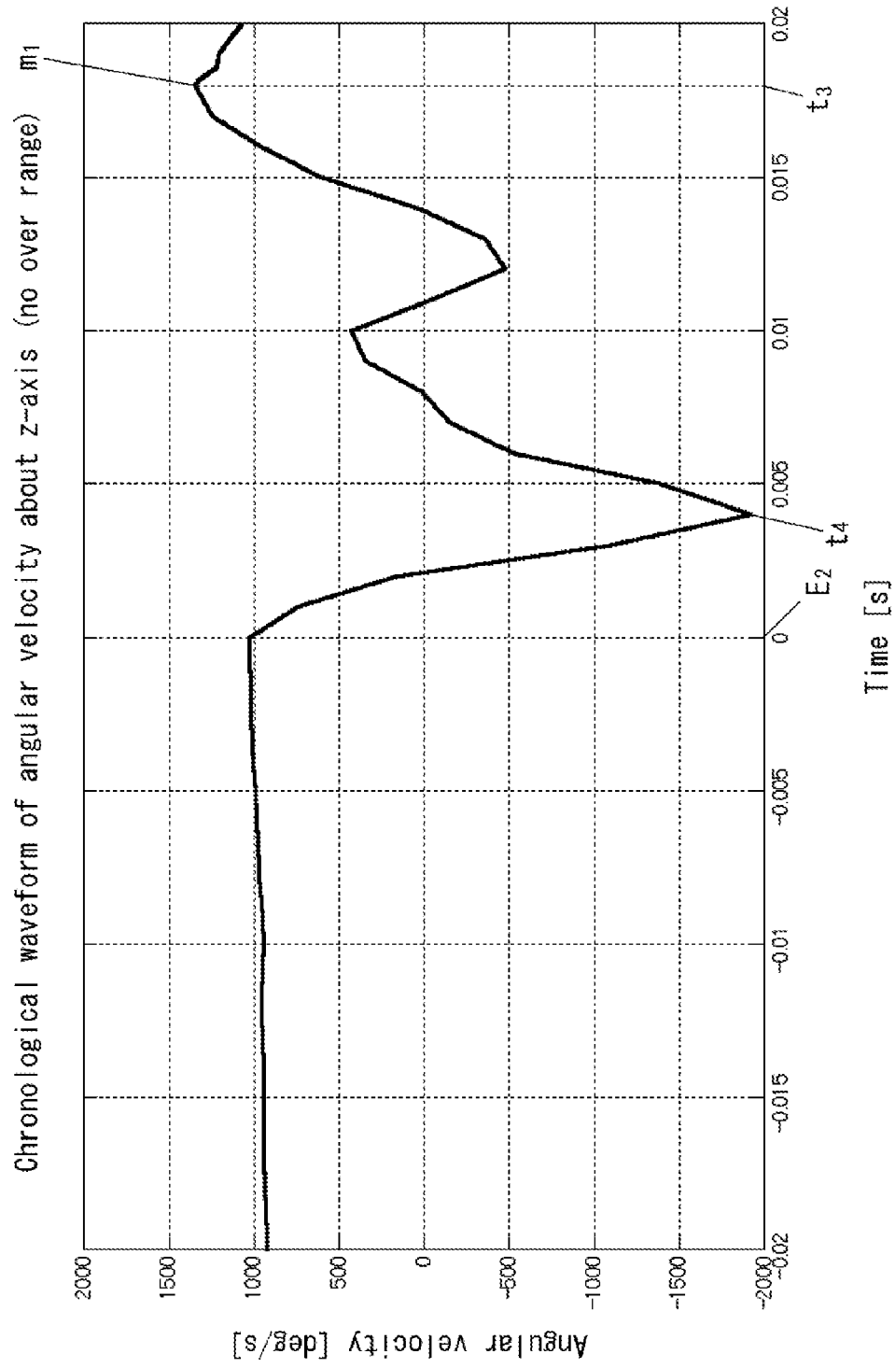
FIG. 11 shows an example of a chronological waveform of an angular velocity about the z-axis in which over range has not occurred.

On the other hand, when it is determined at step S7 that a maximum value has not continued for a predetermined time, the flow advances to step S10 and a second provisional impact time $E_2$ is determined. This second provisional impact time $E_2$ is determined in the following manner. FIG. 11 shows an example of a chronological waveform of the angular velocity about the z-axis in which over range has not occurred, and in the same figure, m1 represents a maximum value. When a minimum value has occurred in a predetermined time (first predetermined time) before a time t3 at which the maximum value m1 has occurred, the time at which this minimum value has occurred is set as t4. Next, when a maximum value has occurred in a predetermined time (second predetermined time) before t4, the time at which this maximum value has occurred is set as the second provisional impact time $E_2$. The predetermined time (first predetermined time) may be set as, for example, 20 msec; whereas the other predetermined time (second predetermined time) may be set as, for example, 30 msec.

Next, at step S11, by using the second provisional impact time $E_2$ determined at step S10, an impact time a2, which is one candidate of the impact time, is extracted from the chronological waveform about the x-axis. Extraction of this impact time a2 can be conducted in a manner similar to the above described impact time a1.

Next, at the same step S11, by using the second provisional impact time $E_2$ determined at step S10, an impact time b2, which is one candidate of the impact time, is extracted from the chronological waveform about the y-axis. Extraction of this impact time b2 can be conducted in a manner similar to the above described impact time b1.

Next, at the same step S11, by using the second provisional impact time $E_2$ determined at step S10, an impact time c2, which is one candidate of the impact time, is extracted from the chronological waveform about the z-axis. This impact time c2 is extracted as a time at which a turning point firstly occurs in a predetermined time duration therearound (third predetermined time duration). It is possible to set the predetermined time duration (third predetermined time duration) as, for example, a time duration starting 40 msec before the second provisional impact time $E_2$ and ending 15 msec after the second provisional impact time $E_2$.

Next, at step S12, rejection of impact time failed to be extracted is conducted for respective sets of impact time candidates of a1, b1, and c1, or impact time candidates of a2, b2, and c2 extracted at step S9 or step S11. A chronological waveform of each of the axes measured by the sensor may include one having over range occurred therein, and when an extraction error occurs in one of the chronological waveforms due to such over range etc., the extraction error may influence the true value of the impact time. Therefore, in the present embodiment, for the purpose of avoiding such an influence, an impact time that is considered as extraction failure among the candidates of extracted impact time is rejected.

Specifically, among the three points of a1, b1, and c1 (same for a2, b2, and c2), an earliest point that has occurred and a latest point that has occurred are determined. Next, if the earliest (latest) point that has occurred is separated from the other two points by, for example, 5 msec or longer, that point is determined as extraction failure of impact time, and is rejected.

Next, at step S13, among the points that have been determined not to be extraction failures at step S12, a point that has occurred at the earliest timing is determined as the impact time.

[Application Example of the Extraction Method of the Present Invention]

The extraction method of the present invention can be applied for determining impact time used for fitting as described above. The extraction method of the present invention can be applied without any particular limitations as long as it is a method for extracting impact time from an angular velocity about a shaft axis measured by a sensor, and can be suitably used in, for example, a below described fitting method of focusing on the whole swing of a golfer.

The fitting method of focusing on the whole swing places focus on the fact that bending of a shaft of a golf club travels from a hand side to a front end side of the shaft as a swing proceeds from the top to the impact. The fitting method has been accomplished as a result of conducting thorough research and examination under an assumption that there is a correlation between swing characteristics (details of the swing characteristics will be described later), of a certain golfer, associated with the course of time from the top to the impact and hardness in every inch of a shaft matching the golfer.

Figure 12:
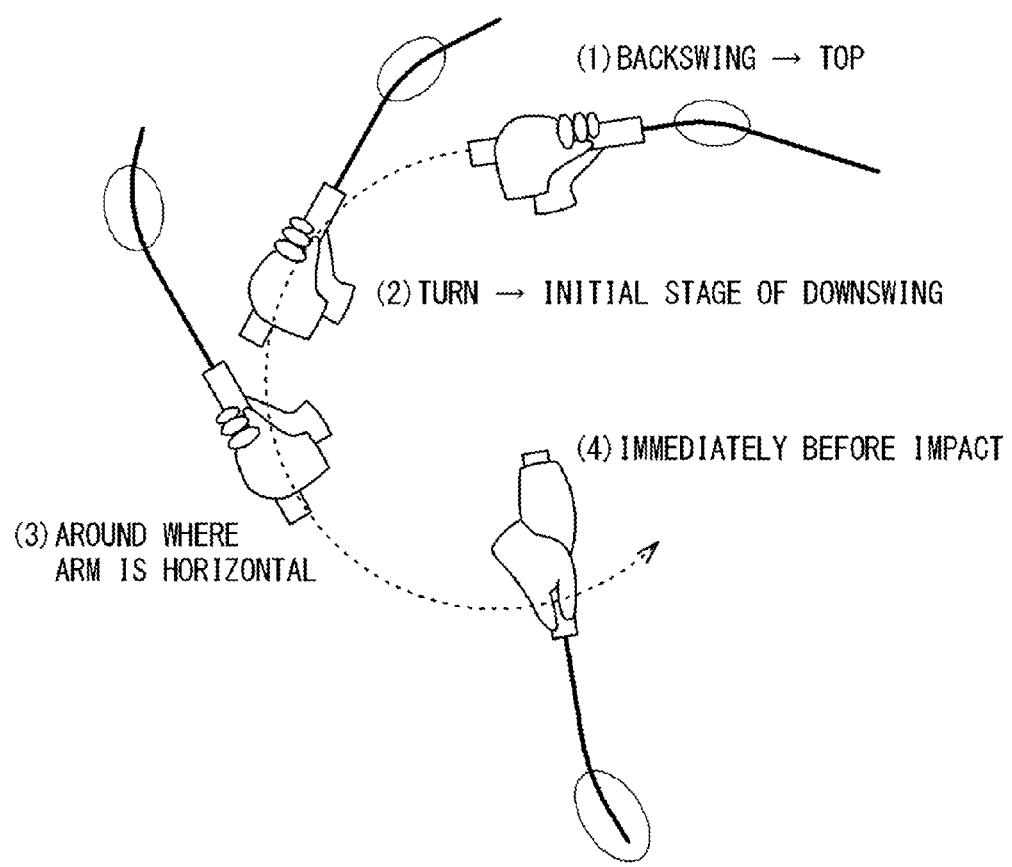
FIG. 12 is a view for describing an action of flexure in a shaft during a swing.

That is, a swing of a golfer when hitting a ball transitions from the address to top and to impact, and, at that moment, since a head having a relatively large weight exists at the front end of a golf club to cause inertia, bending occurs in a shaft of the golf club due to the inertia. The bending does not occur at the same part of the shaft during the whole swing process, and the bending is transferred from the hand side to the front end side of the shaft during the swing from the top to the impact as shown in FIG. 12. In other words, as the swing proceeds from the top to the impact, the position of bending in the shaft moves from the hand side to the front end side of the shaft.

More specifically, at a time point (a time point shown as (1) in FIG. 12) when a backswing is performed after addressing to reach the top, bending occurs in the shaft near the hand. Then, when a turn is performed to reach the initial stage of a downswing (a time point shown as (2) in FIG. 12), the bending moves slightly to the front end side of the shaft. Subsequently, at a time point when a golfer's arm becomes horizontal (a time point shown as (3) in FIG. 12), the bending moves further toward the front end side beyond the center of the shaft. Further, at a time point immediately before impact (a time point shown as (4) in FIG. 12), the bending moves near the front end of the shaft.

In view of the bending of shaft being transferred from the hand side to the front end side of the shaft during a swing from the top to the impact in the above described manner; when focus is placed on swing characteristics of a golfer in the time intervals of (1) to (4), it is possible to select optimal bending stiffness in every inch of the shaft.

Figure 13:
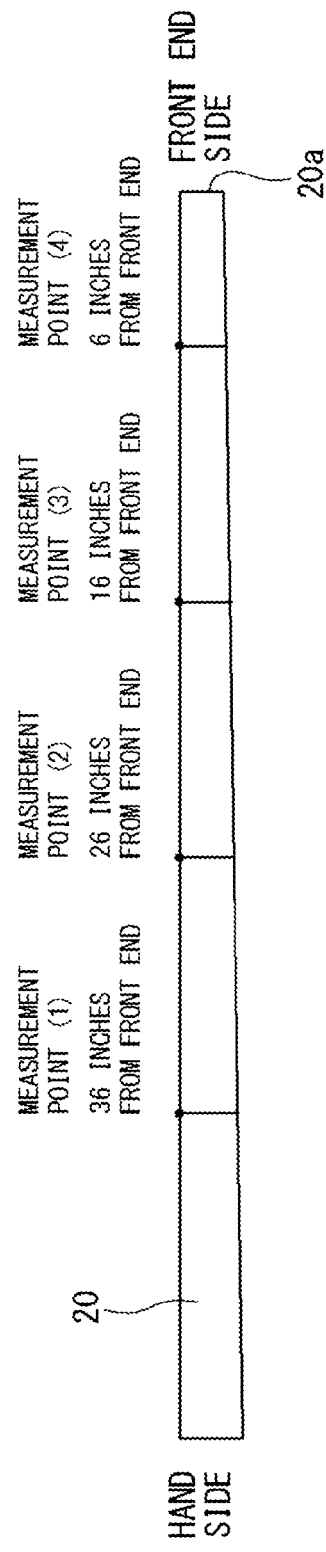
FIG. 13 is a view for describing four positions of a shaft at which bending stiffnesses are measured in a fitting method according to an application example.

Specifically, as shown in FIG. 13, a shaft 20 is divided into four regions, and bending stiffness at a single point in each of the regions is defined. In the present application example, with respect to a tip end 20a of the shaft 20, a part 36 inches therefrom is defined as a measurement point (1), a part 26 inches therefrom is defined as a measurement point (2), a part 16 inches therefrom is defined as a measurement point (3), and a part 6 inches therefrom is defined as a measurement point (4). Then, bending stiffnesses at the four measurement points of the shaft 20 are measured and converted into numerical values. It should be noted that, in the present specification, "every inch" does not mean "at 1 inch, at 2 inches, etc.," but means "every part of a plurality of parts whose distances from one end of a shaft are predetermined inches;" and "predetermined inches" in the present application example are 36 inches, 26 inches, 16 inches, and 6 inches from the tip end 20a of the shaft 20 as described above.

Figure 14:
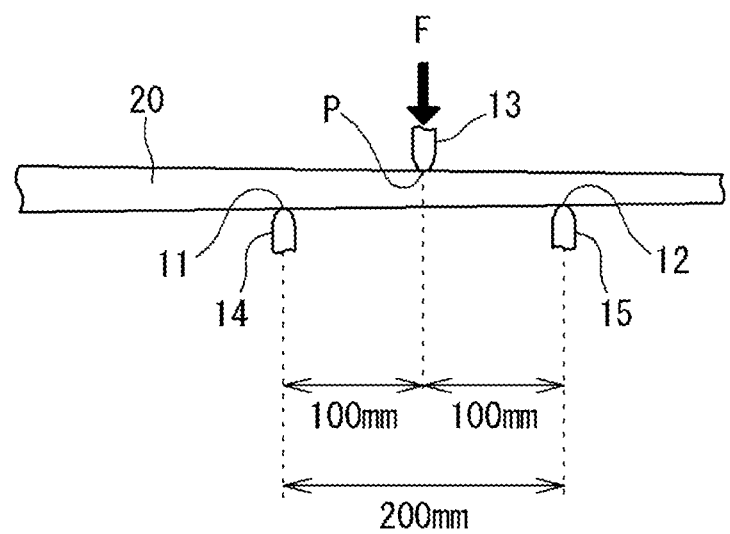
FIG. 14 is a view for describing a method for measuring bending stiffness.

Bending stiffness (EI value: N·m²) of every inch of the shaft can be measured as shown in FIG. 14 using, for example, a model 2020 measuring machine (maximum load 500 kgf) manufactured by INTESCO Co., Ltd.

Specifically, a flexure amount α of a measurement point P is measured when a load F is applied thereto from above while the shaft 20 is supported from below at two supporting points 11 and 12. The measurement point P in the present application example is set at four parts, i.e., 36 inches, 26 inches, 16 inches, and 6 inches from the tip end 20a of the shaft 20. The distance (span) between the supporting point 11 and the supporting point 12 is 200 mm. In addition, the measurement point P is a midpoint between the supporting point 11 and the supporting point 12. The front end of a depressor 13 that applies the load F from above is rounded so as not to damage the shaft 20. A cross-sectional shape of the front end of the depressor 13 in a cross-section parallel to the shaft axis direction has a radius of curvature of 10 mm. In a cross-section perpendicular with respect to the shaft axis direction, a cross-sectional shape of the front end of the depressor 13 is a straight line, and a length thereof is 45 mm.

A support body 14 supports the shaft 20 at the supporting point 11 from below. The front end of the support body 14 has a round convex shape. A cross-sectional shape of the front end of the support body 14 in a cross-section parallel to the shaft axis direction has a radius of curvature of 15 mm. In a cross-section perpendicular with respect to the shaft axis direction, a cross-sectional shape of the front end of the support body 14 is a straight line, and a length thereof is 50 mm. The shape of a support body 15 is identical to that of the support body 14. The support body 15 supports the shaft 20 at the supporting point 12 from below. The front end of the support body 15 has a round convex shape. A cross-sectional shape of the front end of the support body 15 in a cross-section parallel to the shaft axis direction has a radius of curvature of 15 mm. In a cross-section perpendicular with respect to the shaft axis direction, a cross-sectional shape of the front end of the support body 15 is a straight line, and a length thereof is 50 mm.

In a state of having the support body 14 and the support body 15 immobilized, the depressor 13 is moved downward at a velocity of 5 mm/min. Then, the movement of the depressor 13 is stopped at a time point when the load F reaches 20 kg. The flexure amount α (mm) of the shaft 20 at the moment when movement of the depressor 13 is stopped is measured, and bending stiffness EI (N·m²) is calculated in accordance with the following expression (1).

$$\text{Bending Stiffness } EI(N \cdot m^2) = 32.7/\alpha \tag{1}$$

Then, fitting is performed using, as an index, the measured bending stiffness for every inch of the shaft. Since hardness (bending stiffness) of the shaft in every inch is correlated with swing characteristics associated with time from the top to the impact, if the swing characteristics for each golfer can be understood, hardness of the shaft in every inch suiting the characteristics can be determined. With regard to bending or deformation (flexure amount) of the shaft during a swing, the bending is transferred from the hand side to the front end side of the shaft in a downswing from the top as described above. In the present application example, focus has been placed on the transfer of the bending, and since the flexure amount of the shaft around the top is related to the speed of action (angular velocity) of the grip around the top, a golfer having a higher velocity thereof is provided with a harder shaft and a golfer having a lower velocity thereof is provided with a softer shaft.

In the present application example, a rank value is given from among multiple-scale rank values in accordance with bending stiffnesses of the shaft measured for every inch through a usage of the above described method. Specifically, a value of one of 10-scale IFCs is given in accordance with bending stiffness. This IFC is an abbreviation of International Flex Code, and is proposed by the present applicants as an index that represents hardness of a shaft.

The following Tables 1 to 4 are conversion tables for converting an EI value of a shaft to an IFC for the measurement points (1) to (4), respectively. As a method for sorting hardness of a shaft into 10 scales, several methods are conceivable such as a method of sorting shafts into 10 scales using, as subjects, shafts that are all commercially available, and a method of sorting shafts into 10 scales within a range of shafts intended to be provided to a user by a fitter while taking into consideration frequency of usage etc. However, in the present application example, fitting is performed using the latter of the two methods.

TABLE 1

(a) IFC at 36 inches

| IFC | EI value [×9.8 N·m$^2$] | | |
|---|---|---|---|
| | Maximum | ~ | Minimum |
| 9 | | ~ | 8.295 |
| 8 | 8.295 | ~ | 7.86 |
| 7 | 7.86 | ~ | 7.425 |
| 6 | 7.425 | ~ | 6.99 |
| 5 | 6.99 | ~ | 6.555 |
| 4 | 6.555 | ~ | 6.12 |
| 3 | 6.12 | ~ | 5.685 |
| 2 | 5.685 | ~ | 5.25 |
| 1 | 5.25 | ~ | 4.185 |
| 0 | 4.185 | ~ | 0 |

TABLE 2

(b) IFC at 26 inches

| IFC | EI value [×9.8 N·m$^2$] | | |
|---|---|---|---|
| | Maximum | ~ | Minimum |
| 9 | | ~ | 5.543 |
| 8 | 5.543 | ~ | 5.306 |
| 7 | 5.306 | ~ | 5.069 |
| 6 | 5.069 | ~ | 4.832 |
| 5 | 4.832 | ~ | 4.595 |
| 4 | 4.595 | ~ | 4.358 |
| 3 | 4.358 | ~ | 4.121 |
| 2 | 4.121 | ~ | 3.884 |
| 1 | 3.884 | ~ | 3.647 |
| 0 | 3.647 | ~ | 0 |

TABLE 3

(c) IFC at 16 inches

| IFC | EI value [×9.8 N·m$^2$] | | |
|---|---|---|---|
| | Maximum | ~ | Minimum |
| 9 | | ~ | 3.849 |
| 8 | 3.849 | ~ | 3.658 |
| 7 | 3.658 | ~ | 3.467 |
| 6 | 3.467 | ~ | 3.276 |
| 5 | 3.276 | ~ | 3.085 |
| 4 | 3.085 | ~ | 2.894 |
| 3 | 2.894 | ~ | 2.703 |
| 2 | 2.703 | ~ | 2.512 |
| 1 | 2.512 | ~ | 2.321 |
| 0 | 2.321 | ~ | 0 |

TABLE 4

(d) IFC at 6 inches

| IFC | EI value [×9.8 N·m$^2$] | | |
|---|---|---|---|
| | Maximum | ~ | Minimum |
| 9 | | ~ | 2.94 |
| 8 | 2.94 | ~ | 2.86 |
| 7 | 2.86 | ~ | 2.78 |
| 6 | 2.78 | ~ | 2.7 |
| 5 | 2.7 | ~ | 2.62 |
| 4 | 2.62 | ~ | 2.54 |
| 3 | 2.54 | ~ | 2.46 |
| 2 | 2.46 | ~ | 2.38 |
| 1 | 2.38 | ~ | 2.3 |
| 0 | 2.3 | ~ | 0 |

<Swing Characteristic Amount>

FIGS. 15 to 18 are views for describing a swing by a golfer from the address to the finish. Although the swing includes the follow-through after the impact, in the present application example, focus has been placed on characteristics of the swing from the address to the impact.

Figure 18:
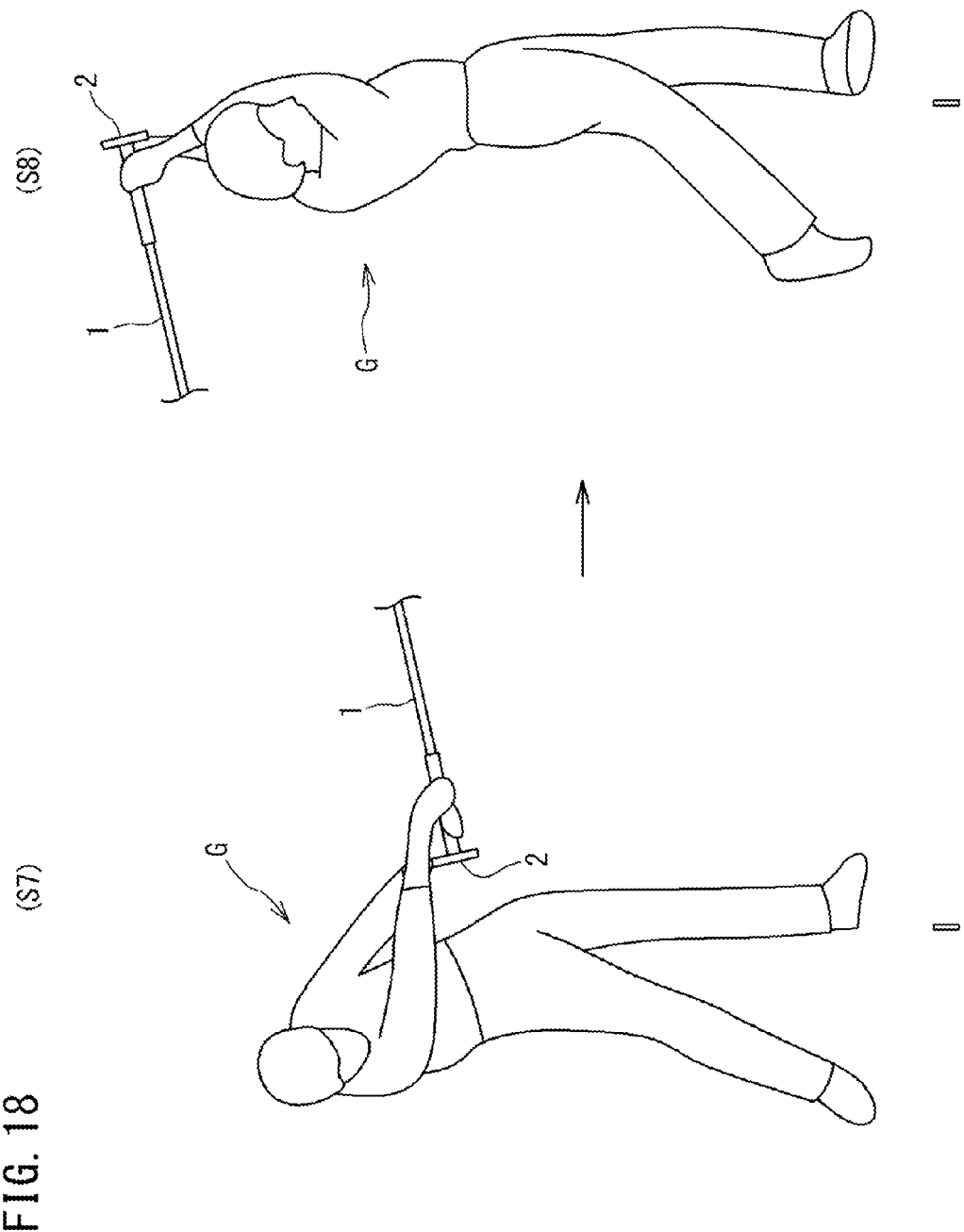
FIG. 18 shows the follow-through and finish in a swing.

FIGS. 15 to 18 are views of a golfer seen from the front. The beginning of a swing is referred to as the address, and the end of a swing is referred to as the finish. The swing proceeds in a sequence of (S1), (S2), (S3), (S4), (S5), (S6), (S7), and (S8). In FIG. 15, (S1) is the address, and (S2) is the backswing. In FIG. 16, (S3) is the top (top of swing). Ordinarily, the movement velocity of the head during a swing is the lowest at the top. In FIG. 16, (S4) is the downswing. Although (S5) in FIG. 17 is also the downswing, it is a more advanced state of the downswing than (S4) in FIG. 16. In FIG. 17, (S6) is the impact, which is the moment when the head 1a of the golf club 1 and the ball B collide. In FIG. 18, (S7) is the follow-through, and (S8) is the finish. With the finish, the swing ends.

In the present application example, among the above described various stages of the swing, focus is placed on an angular velocity ωy in a direction of a wrist cock during a downswing from around the top to the impact, and the angular velocity ωy is subdivided and quantified depending on elapsed time. It should be noted that, in the present specification, "around the lop" refers to a time interval including a predetermined time immediately before the top and a predetermined time immediately after the top, and more specifically, refers to a time interval of, for example, 100 msec between −50 msec from the top and +50 msec from the top.

Figure 19:
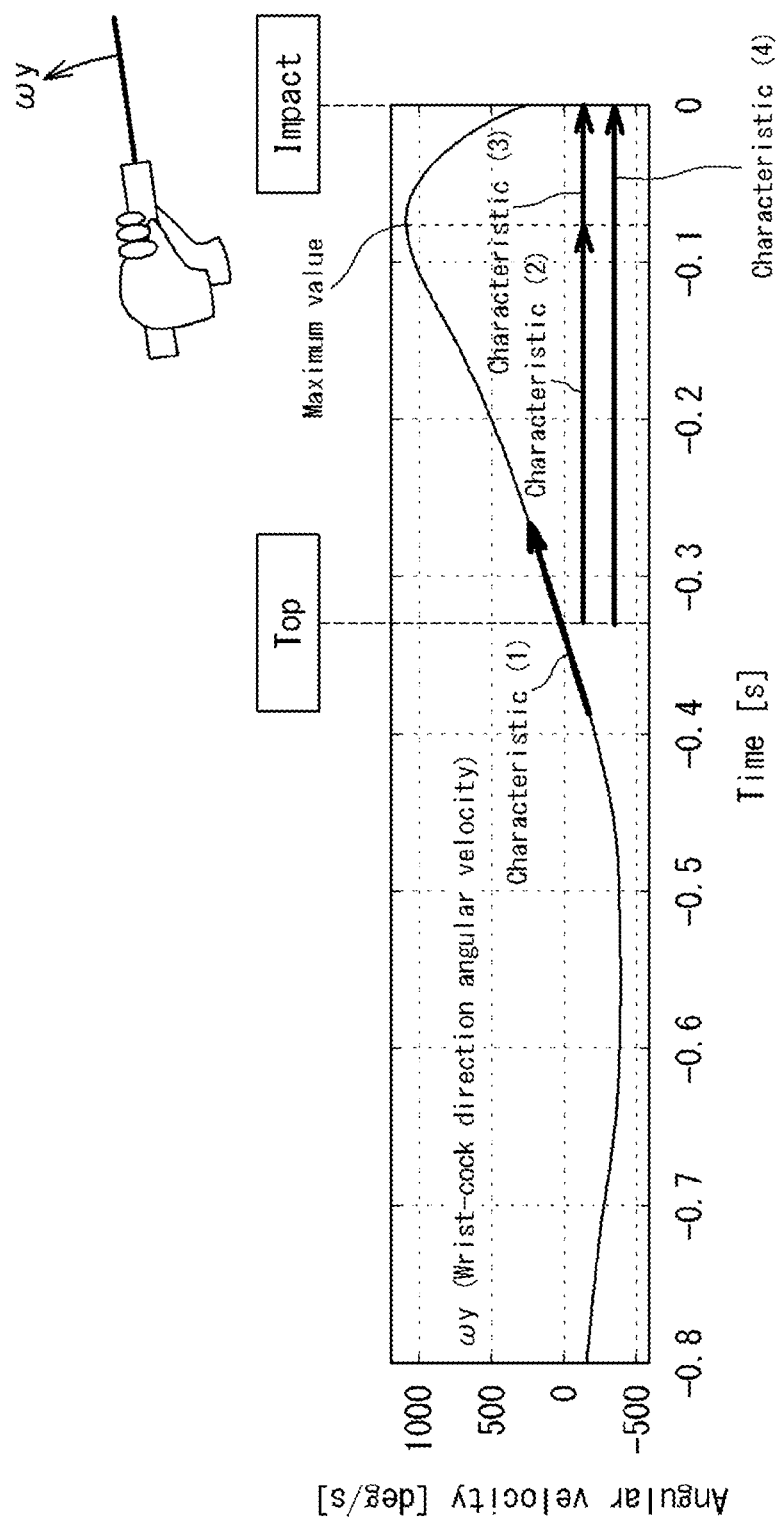
FIG. 19 shows a change in an angular velocity in a direction of a wrist cock during a swing depending on elapsed time.

FIG. 19 shows a relationship, in a certain swing, between time (s) from the address to the impact and the angular velocity ωy (deg/s) in the direction of a wrist cock. In the present application example, as shown in FIG. 19, four swing characteristics of (1) to (4) are configured depending on elapsed time of the swing, and the swing characteristics are each quantified.

The swing characteristic amount (1) is the slope of the angular velocity ωy in the direction of a wrist cock around the top, and, for example, can be represented as a sum of an angular velocity ωy 50 msec before the top and an angular velocity ωy 50 msec after the top. The swing characteristic amount (1) is correlated with the above described bending stiffness at the measurement point of 36 inches from the tip end of the shaft.

The swing characteristic amount (2) is an average value of the angular velocity ωy from the top to a time point at which the angular velocity ωy becomes a maximum. The average value can be obtained by obtaining a maximum value of the angular velocity ωy from the top to the impact, and dividing an accumulated value of the angular velocity ωy from the top to the time point at which the maximum value is obtained by a time period from the top to the time point at which the maximum value is obtained. The swing characteristic amount (2) is correlated with the above described bending stiffness at the measurement point of 26 inches from the tip end of the shaft.

The swing characteristic amount (3) is an average value of the angular velocity ωy from a time point at which the angular velocity ωy becomes a maximum to the impact, and the average value can be obtained by dividing an accumulated value of the angular velocity ωy from the time point at which the maximum value is obtained to the impact by a time period from the time point at which the maximum value is obtained to the impact. The swing characteristic amount (3) is correlated with the above described bending stiffness at the measurement point of 16 inches from the tip end of the shaft.

The swing characteristic amount (4) is an average value of the angular velocity ωy from the top to the impact, and the average value can be obtained by dividing an accumulated value of the angular velocity ωy from the top to the impact by a time period from the top to the impact. This swing characteristic amount (4) is correlated with the above described bending stiffness at the measurement point of 6 inches from the tip end of the shaft.

For the swing characteristic amounts (1) to (4), a golfer hoping for a fitting is asked to test-hit a predetermined number of balls, for example, five balls, and swing characteristic amounts obtained upon hitting each of the balls can be averaged to be set as swing characteristic amounts of the golfer.

<Calculation of Shaft Stiffness in Every Inch>

Next, based on the calculated swing characteristic amounts (1) to (4), shaft stiffnesses suited for the golfer are calculated in every inch. Preceding this calculation, an approximate expression representing a relationship between swing characteristic amount and preferable bending stiffness (EI value) of a shaft is obtained for each of the swing characteristic amounts. The approximate expression is created based on data collected by having multiple testers conduct test-hits. From a standpoint of increasing reliability of the approximate expression, having a larger number of testers is preferable. In the present application example, the testers are intermediate-level or advanced-level players having a handicap of 20 or lower. For each of the testers, several golf clubs have been selected from multiple golf clubs (drivers) prepared in advance using as a reference the weight, length, and flex (or kick point) of golf clubs that are ordinarily used by a tester. Then, a tester is asked to test-hit several balls (excluding miss-shots), e.g., six balls, for each of the several golf clubs, and is asked to select a golf club enabling easy hitting in accordance with a later described standard.

With regard to a golf club enabling easy hitting, three items of "flight distance," "directionality," and "ease of swinging" are scored in accordance with evaluation standards shown in, for example, the following Table 5; and a club whose sum total of score is 1.5 points or higher is determined as a club enabling easy hitting. The selected several golf clubs have their shaft portions painted in black, and are randomly provided to a tester. With this, a tester cannot determine which club he or she is hitting with. The test-hitting is performed in two sets of three balls for each club, and a questionnaire regarding ease of swinging is given to the tester for scoring, every time he or she has test-hit three balls with a certain club.

TABLE 5

Figure 20:
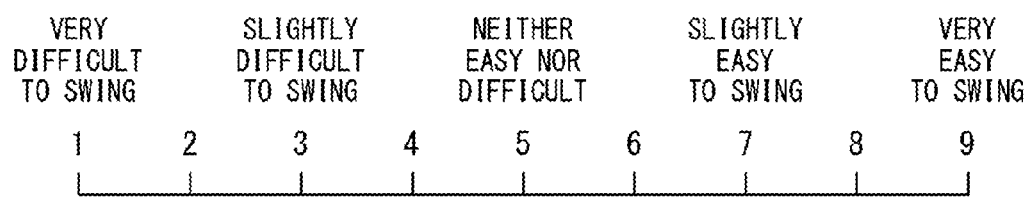
FIG. 20 is a view for describing an evaluation standard for ease of swinging.

| Item | Evaluation Standard | Score |
|---|---|---|
| Flight Distance | Different from other clubs by 10% significance level(larger flight distance) | +1.0 |
| | Different from other clubs by 15% significance level (larger flight distance) | +0.5 |
| | Different from other clubs by 10% significance level (smaller flight distance) | −1.0 |
| | Different from other clubs by 15% significance level (smaller flight distance) | −0.5 |
| Directionality | Average value of left-right deviation is within ±10 yards from center | +0.5 |
| | Average value of left-right deviation is not smaller than ±30 yards from center | −0.5 |
| | σ of left-right deviation is within ±10 yards | +0.5 |
| | σ of left-right deviation is not smaller than ±20 yards | −0.5 |
| Ease of Swinging | Club that obtained the highest score in 9-scale evaluation shown in FIG. 20 | +0.5 |
| | Club that scored lower than 5 points in 9-scale evaluation shown in FIG. 20 | −0.5 |

Figure 21:
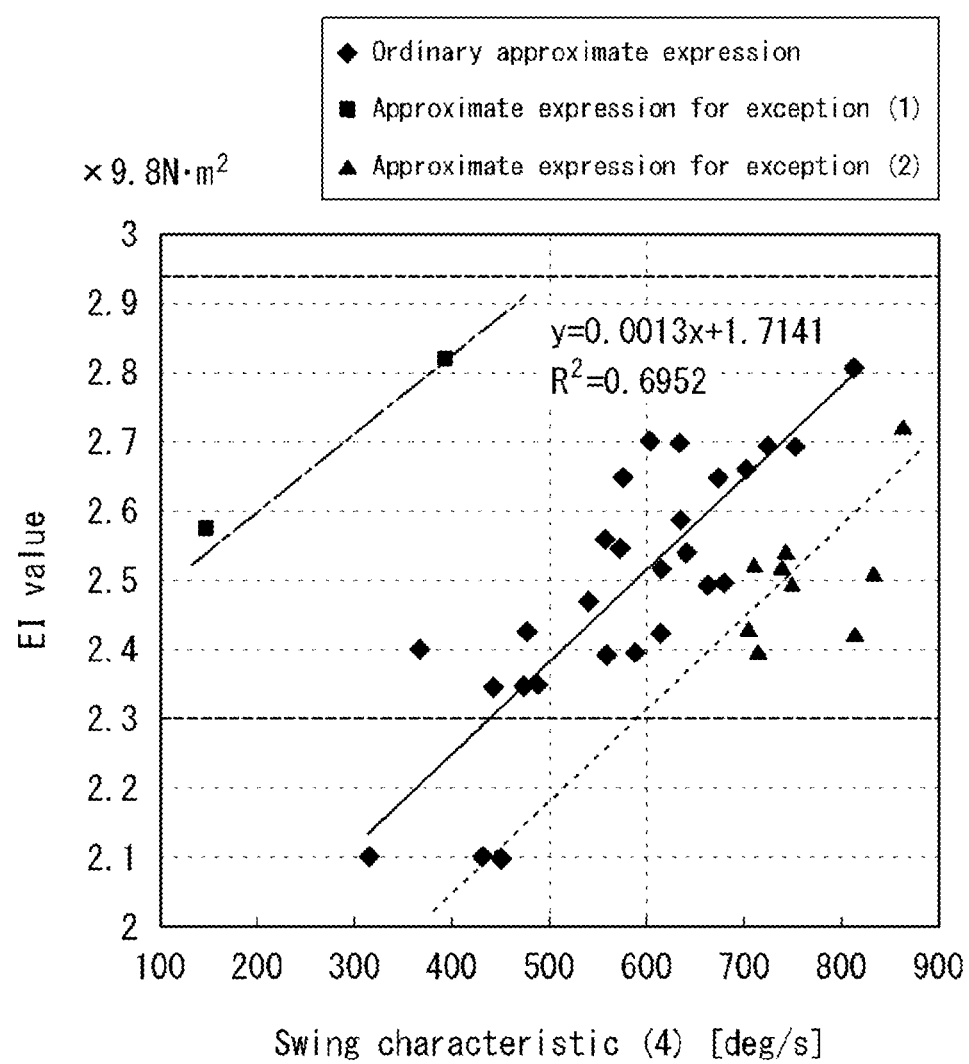
FIG. 21 shows a relationship between bending stiffness (EI value) and swing characteristic amount (4) at a measurement point of "6 inches."
Figure 22:
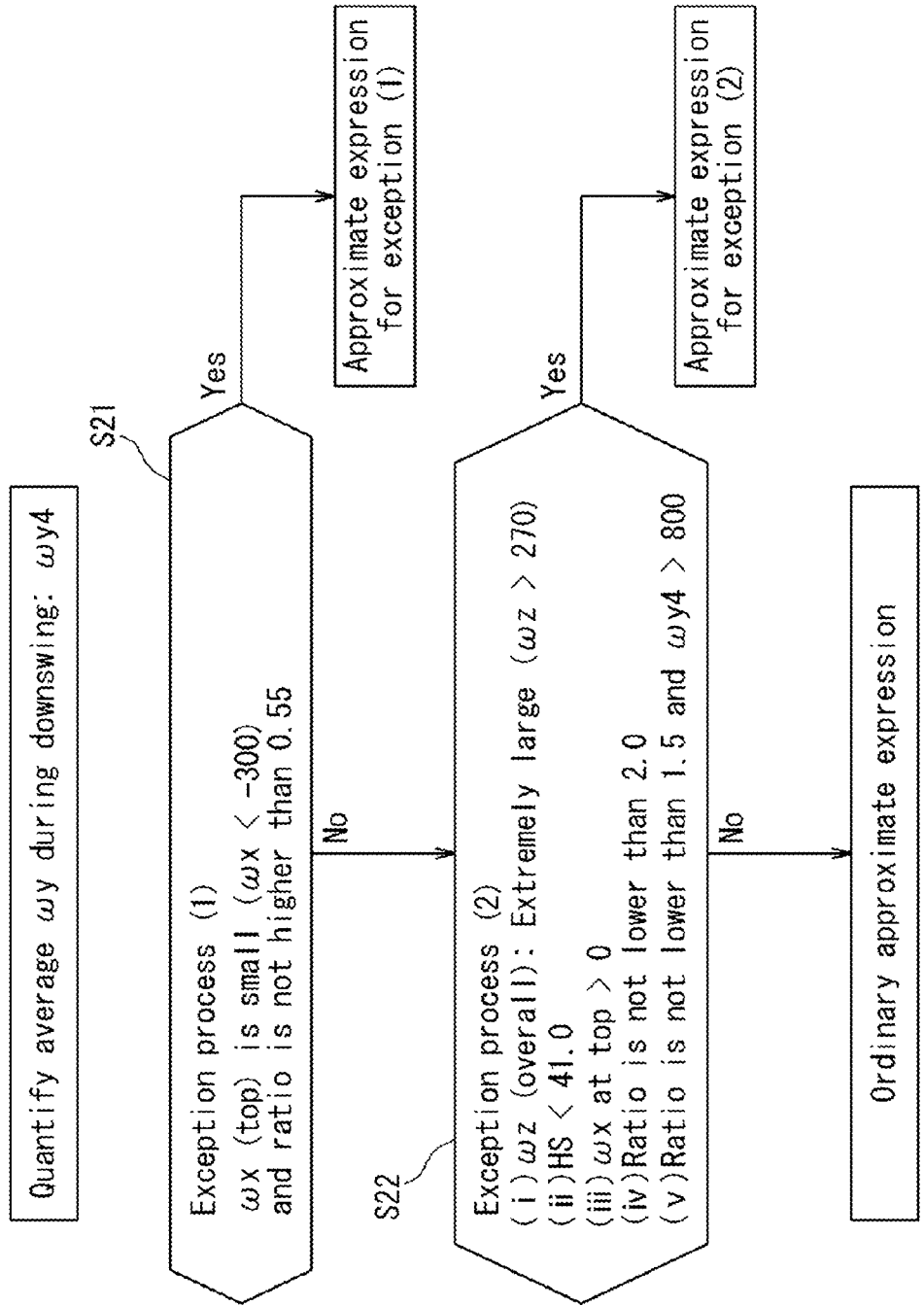
FIG. 22 shows a flow for calculating an EI value at the measurement point of "6 inches."

FIG. 21 shows a relationship between bending stiffness (EI value) and the swing characteristic amount (4) at the measurement point of "6 inches" created in advance as described above, and FIG. 22 shows a flow for calculating the EI value at the measurement point of "6 inches." It should be noted that, in FIG. 22, "ωy4" is the swing characteristic amount (4) of the angular velocity in the direction of a wrist cock.

In the present application example, for the purpose of improving accuracy of calculating the EI value, not only one approximate expression but three approximate expressions are prepared in advance. Although it is possible to represent the relationship between the swing characteristic amount (4) and the EI value at the measurement point of "6 inches" with a single approximate expression, there are cases where a highly reliable EI value cannot be calculated with a single approximate expression for golfers whose swings are deviated from average such as golfers having an extremely low angular velocity ωx in the x-axial direction around the top and golfers having considerably low head-speeds. Therefore, in addition to an ordinary approximate expression for average golfers, an approximate expression for exception (1) and an approximate expression for exception (2) are prepared in the present application example.

First, exception process (1) is executed at step S21. Specifically, it is determined whether or not the angular velocity ωx in the x-axial direction around the top satisfies ωx<−300, and the ratio (ωy (overall)/ωx (overall)) between an average value of the angular velocity ωy in the y-axial direction from the top to the impact and an average value of the angular velocity ωx in the x-axial direction from the top to the impact is 0.55 or lower. And if the result is YES, the EI value is calculated using the approximate expression for exception (1) shown by a long dashed short dashed line in FIG. 21.

On the other hand, if the result is NO at step S21, the flow advances to step S22 and exception process (2) is executed. In this exception process (2), it is determined whether or not at least one of the following five conditions of (a) to (e) is satisfied.

(a) An accumulated value of the angular velocity ωz in the z-axial direction from the top to the impact is extremely large as ωz>270.

(b) The head speed is lower than 41.0 m/s.

(c) The angular velocity ωx in the x-axial direction around the top satisfies ωx>0.

(d) The ratio (ωy (overall)/ωx (overall)) between an average value of the angular velocity ωy in the y-axial direction from the top to the impact and an average value of the angular velocity ωx in the x-axial direction from the top to the impact is 2.0 or higher.

(e) The ratio (ωy (overall)/ωx (overall)) between an average value of the angular velocity ωy in the y-axial direction from the top to the impact and an average value of the angular velocity ωx in the x-axial direction from the top to the impact is 1.5 or higher, and the swing characteristic amount (4) is larger than 800.

If the result is YES at step S22, the EI value is calculated using the approximate expression for exception (2) shown as a short dashed line in FIG. 21. On the other hand, if the result is NO at step S22, the EI value is calculated using an ordinary approximate expression shown as a solid line in FIG. 21.

The ordinary approximate expression, the approximate expression for exception (1), and the approximate expression for exception (2) can all be regarded as a linear expression representing a regression line obtained by least squares method. Slopes and intercepts of the respective expressions are shown in the following Table 6.

TABLE 6

|  | Slope | Intercept |
|---|---|---|
| Ordinary approximate expression |  | 1.74 |
| Approximate expression for exception (1) | 0.00135 | 1.74 + 0.6 |
| Approximate expression for exception (2) |  | 1.74 − 0.2 |

Also for the swing characteristic amount (3), the swing characteristic amount (2), and the swing characteristic amount (1); bending stiffnesses (EI values) can be calculated using approximate expressions showing a relationship between bending stiffness (EI value) and the swing characteristic amount at measurement points in every inch created in a similar manner.

<Calculation of IFC in Every Inch>

With respect to the EI value of the shaft calculated in every inch using the above described method, one of the values of the 10-scale IFC is calculated using a conversion table shown in, for example, Tables 1 to 4. As described above, in the present application example, a method of sorting shafts into 10 scales within a range of shafts intended to be provided to a user by a fitter while taking into consideration frequency of usage etc., is employed.

<Shaft Selection>

In the manner described above, IFC in every inch is calculated for a golfer to whom a fitting is performed. Examples of calculated IFC may include 36 inches: 5, 26 inches: 4, 16 inches: 4, and 6 inches: 2.

Then, a shaft that matches the most with the calculation result is selected from a database. The database has stored therein data of multiple types of shafts regarding weight, IFC measured in advance in every inch, etc. By using the database, "match index" shown in the following expression (2) is calculated for all clubs stored in the database, and a club whose value thereof is the smallest is suggested to the golfer. It should be noted that "match index" in the present specification does not mean the degree of match but indicates an index whose value is small when a shaft has a bending stiffness that is close to a calculation result, as obvious from expression (2). A match index of zero means a shaft has bending stiffness that is identical to a calculation result in every inch.

$$(\text{Match Index}) = \sum_{i=1}^{4} |\text{Calculated } i - \text{Database } i| \quad (2)$$

When there are multiple shafts whose match indices are small to the same degree, multiple shafts may be suggested to the user, or they may be narrowed down to a single shaft after taking into consideration a request of the user. As the standard for narrowing down to a single shaft, there are methods such as a method of placing greater value on ease of swinging by prioritizing a match index of IFC at "36 inches" or "26 inches" on the shaft hand side, and a method of placing greater value on performance (flight distance, directionality) by prioritizing a match index of IFC at "16 inches" or "6 inches" on the shaft front end side.

It should be understood that the embodiments disclosed herein are merely illustrative and not restrictive in all aspects. The scope of the present invention is defined by the scope of the claims rather than by the meaning described above, and is intended to include meaning equivalent to the scope of the claims and all modifications within the scope.

REFERENCE SIGNS LIST

1 golf club
2 sensor
2*a* casing
10 computer (data analysis device)
20 shaft
20*a* tip end
20*b* butt end
30 laser oscillator
31 laser receiver
G golfer
B ball
Be back end of ball

What is claimed is:

1. A method for extracting impact time in a golf swing, comprising the steps of:
    acquiring at least one chronological waveform among chronological waveforms of an angular velocity ωx about x-axis, an angular velocity ωy about y-axis, and an angular velocity ωz about z-axis obtained when a golf ball is hit by a golf club attached with a sensor capable of measuring angular velocities about three axes, when the x-axis is orientated in a direction along a toe-heel direction of a golf club head, when the y-axis is orientated so as to follow along a direction in which a ball is hit, and when the z-axis is orientated to match an axial direction of a shaft;
    acquiring timing at which laser light, disposed immediately in front of where the golf club head impacts the ball, is shielded by the golf club head or the shaft; and
    determining an impact time using the at least one chronological waveform and the timing, wherein
    the step of determining comprises the sub-steps of:
        calculating, when timing at which a signal indicating laser blockage transmitted from a light receiver configured to receive the laser light is received by the sensor is defined as trigger timing, an amount of change of the angular velocity about the x-axis in a predetermined time interval before the trigger timing; and determining whether or not the calculated amount of change of the angular velocity is larger than a predetermined threshold.

2. The method for extracting impact time in a golf swing according to claim 1, wherein at the step of determining, when the calculated amount of change of the angular velocity is determined to be smaller than a predetermined threshold, the step of determining further comprises the sub-steps of:
- judging whether or not the angular velocity $\omega z$ is over range in a predetermined time duration;
- configuring a first provisional impact time when a judgment of over range is obtained in the step of judging, and configuring a second provisional impact time when a judgment of over range has not been obtained in the step of judging;
- acquiring three candidates for impact time from respective chronological waveforms of the angular velocity $\omega x$, the angular velocity $\omega y$, and the angular velocity $\omega z$ using the configured first or second provisional impact time as reference; and
- determining impact time in accordance with a predetermined determination criterion from the three candidates for impact time.

3. The method for extracting impact time in a golf swing according to claim 2, wherein the first provisional impact time is set to a time at which over range has occurred in the chronological waveform of the angular velocity $\omega z$.

4. The method for extracting impact time in a golf swing according to claim 3, wherein, when a minimum value has occurred in the chronological waveform of the angular velocity $\omega z$ in a first predetermined time before a time at which a maximum value has occurred, the second provisional impact time is set as a time at which a maximum value has occurred in a second predetermined time before the time at which the minimum value has occurred.

5. The method for extracting impact time in a golf swing according to claim 4, wherein the laser light is disposed, when a flight direction of the ball is used as reference, 1 mm to 10 mm behind a back end of a ball.

6. The method for extracting impact time in a golf swing according to claim 3, wherein the laser light is disposed, when a flight direction of the ball is used as reference, 1 mm to 10 mm behind a back end of a ball.

7. The method for extracting impact time in a golf swing according to claim 2, wherein, when a minimum value has occurred in the chronological waveform of the angular velocity $\omega z$ in a first predetermined time before a time at which a maximum value has occurred, the second provisional impact time is set as a time at which a maximum value has occurred in a second predetermined time before the time at which the minimum value has occurred.

8. The method for extracting impact time in a golf swing according to claim 7, wherein the laser light is disposed, when a flight direction of the ball is used as reference, 1 mm to 10 mm behind a back end of a ball.

9. The method for extracting impact time in a golf swing according to claim 2, wherein the laser light is disposed, when a flight direction of the ball is used as reference, 1 mm to 10 mm behind a back end of a ball.

10. The method for extracting impact time in a golf swing according to claim 1, wherein the laser light is disposed, when a flight direction of the ball is used as reference, 1 mm to 10 mm behind a back end of a ball.

* * * * *